US008504323B2

(12) United States Patent
Coradi

(10) Patent No.: US 8,504,323 B2
(45) Date of Patent: Aug. 6, 2013

(54) EMERGENCY PATIENT MEDICATION SYSTEM

(76) Inventor: Scott Anthony Coradi, Murrells Inlet, SC (US)

(*) Notice: Subject to any disclaimer, the term of this patent is extended or adjusted under 35 U.S.C. 154(b) by 246 days.

(21) Appl. No.: 12/804,149

(22) Filed: Jul. 15, 2010

(65) Prior Publication Data

US 2012/0016631 A1    Jan. 19, 2012

(51) Int. Cl.
*G01G 9/00*    (2006.01)
(52) U.S. Cl.
USPC ........................................ 702/173; 177/25.13
(58) Field of Classification Search
USPC ........................................ 702/173; 177/25.11
See application file for complete search history.

(56) References Cited

U.S. PATENT DOCUMENTS

| 4,015,677 | A | * | 4/1977 | Silva et al. ..................... 177/165 |
| 4,139,070 | A | * | 2/1979 | Hanson et al. ................. 177/200 |
| 4,803,625 | A | * | 2/1989 | Fu et al. .......................... 600/483 |
| 5,393,935 | A | * | 2/1995 | Hasty et al. ..................... 177/45 |
| 5,494,051 | A | * | 2/1996 | Schneider, Sr. .................. 5/625 |
| 5,672,849 | A | * | 9/1997 | Foster et al. .................. 177/144 |
| 6,000,828 | A | * | 12/1999 | Leet ................................... 705/2 |
| 7,381,910 | B1 | * | 6/2008 | Wilkerson et al. ............ 177/144 |
| 7,612,301 | B2 | * | 11/2009 | Arnold et al. ...................... 177/1 |
| 7,937,289 | B2 | * | 5/2011 | Bodin et al. ..................... 705/22 |
| 2006/0015289 | A1 | * | 1/2006 | Shakman et al. ............. 702/173 |
| 2006/0149140 | A1 | * | 7/2006 | Eldridge ....................... 600/300 |
| 2008/0005838 | A1 | * | 1/2008 | Wan Fong et al. ................ 5/600 |
| 2009/0151073 | A1 | * | 6/2009 | Kramer ............................. 5/610 |
| 2012/0089419 | A1 | * | 4/2012 | Huster et al. ..................... 705/3 |

* cited by examiner

*Primary Examiner* — Andrew Schechter
*Assistant Examiner* — L. Anderson
(74) *Attorney, Agent, or Firm* — Carlson, Gaskey & Olds, P.C.

(57) ABSTRACT

A computer based system is disclosed for providing emergency medical personnel with a means for rapidly ascertaining an accurate estimated weight for a non-responsive and potentially critically ill patient. The system acquires the gross weight of the patient, the support upon which the patient is lying and all life support equipment that may be on that support. From data stored in a data base, and from information input into the system by the personnel on hand, the weights of everything except the patient are deducted by the system to arrive at the patient's weight. That weight is then resident in the system and serves to allow the system to accurately calculate the correct dosages of medications to be administered to the patient while warning the personnel if dangerous interactions are possible. The system includes protocols for treating a wide variety of emergency medical conditions in both hospital and military environments.

26 Claims, 49 Drawing Sheets

Resuscitation Station

Resuscitation Station

Enter known weight xx in kg or # <u></u>

Measured Weight

[ 297.3 Kg INCLUDES WT. OF STRETCHER ] ~122

- Enter stretcher ID or Stretcher Weight

[ # ] ~126

[ WT? ] ~128

- Stretcher ID #
- Stretcher Weight in KG
  - See Label on stretcher
  - Check for alignment and no personnel contact

[ Demographics ] ~130  [ Allergies ] ~132  [ Current Medications ] ~134

[ Accept ] ~136  [ Modify ] ~138

FIG. 3D

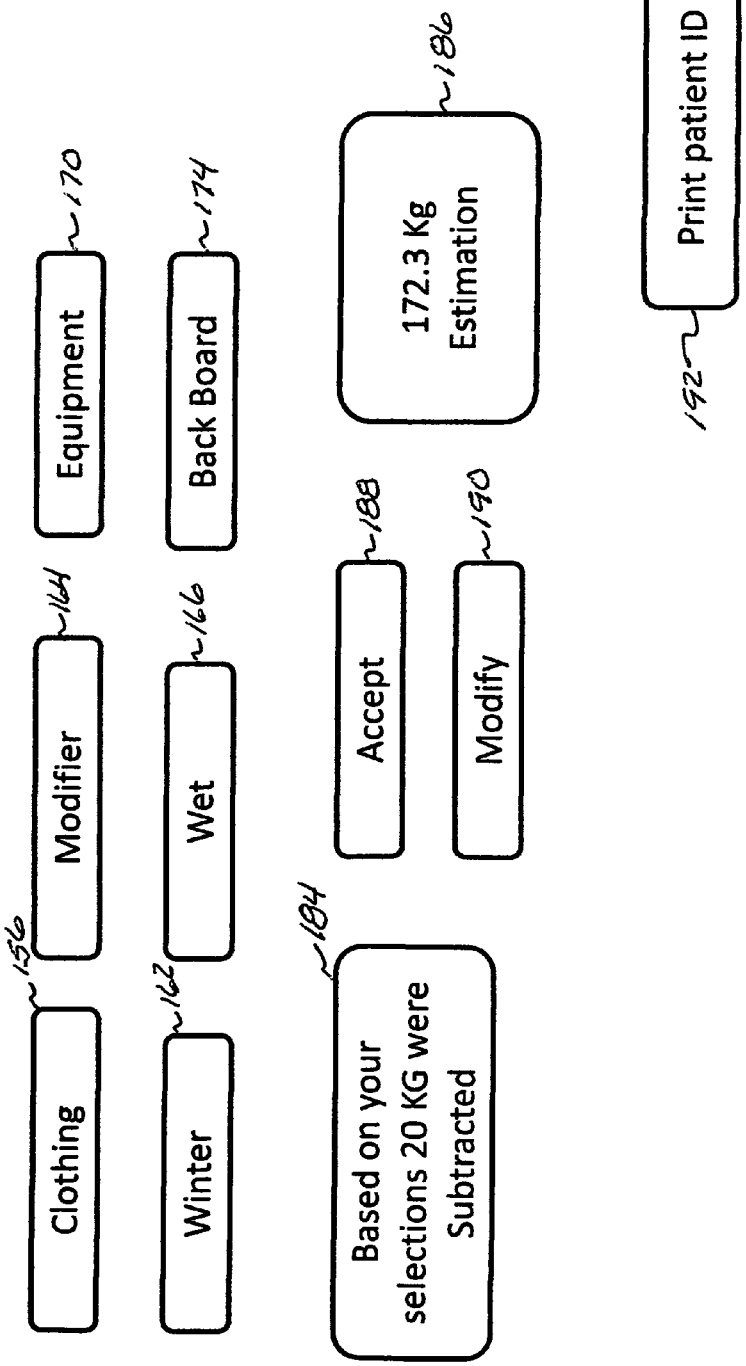

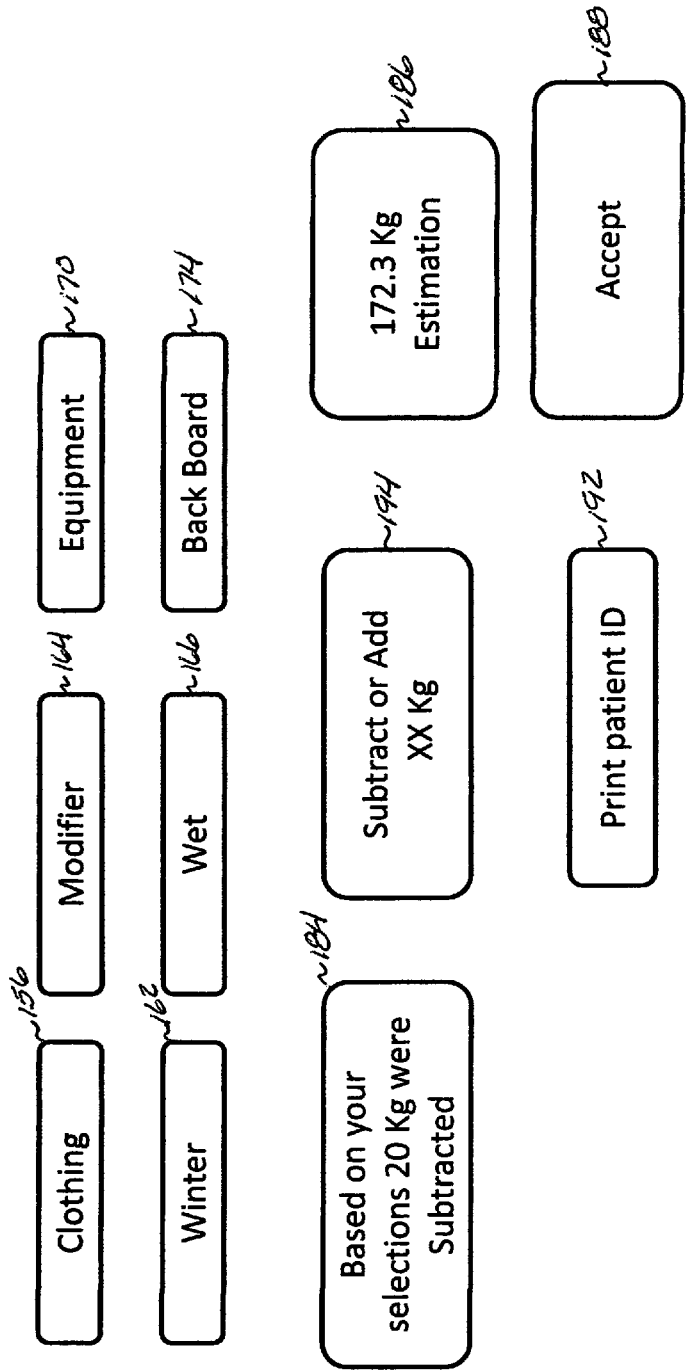

ACLS/PALS ASYSTOLE

- EPINEPHERINE 0.01MG/KG
- BASED ON CALCULATED WEIGHT
- DELIVER 172.3 Kg Estimation 1 mg /IV PUSH Max Dose

CONSIDER

External Pacing
Atropine

- NO INTERACTIONS OR ALLERGIES NOTES

PATIENT INFO

Consultant    Look up

FIG. 8C

ACLS/PALS ASYSTOLE

- EPINEPHERINE: DELIVERED

422 — [H]

438 — 172.3 Kg Estimation

- RESPONSE:

462 — NONE CONTINUE ASYSTOLE

464 — NEW RHYTHM

466 — Summary   324 — Consultant   326 — Look up

FIG. 8D

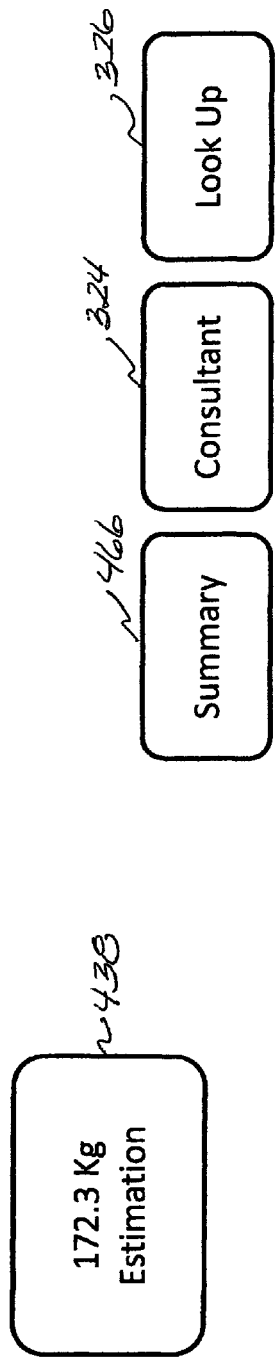

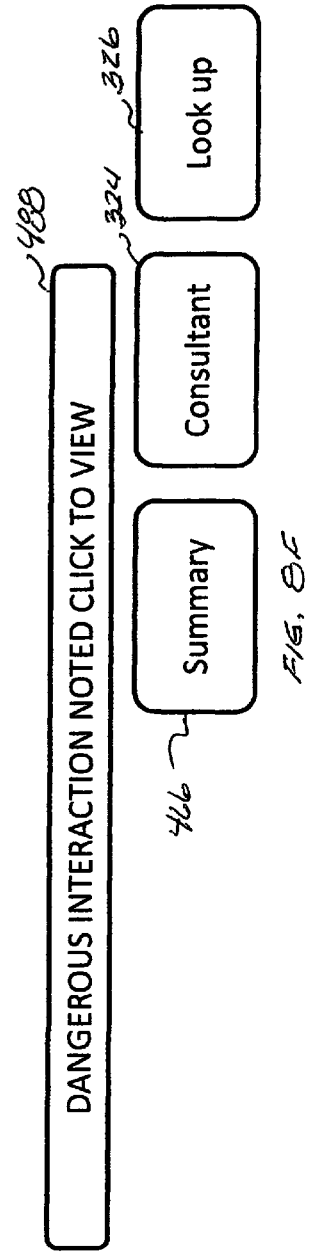

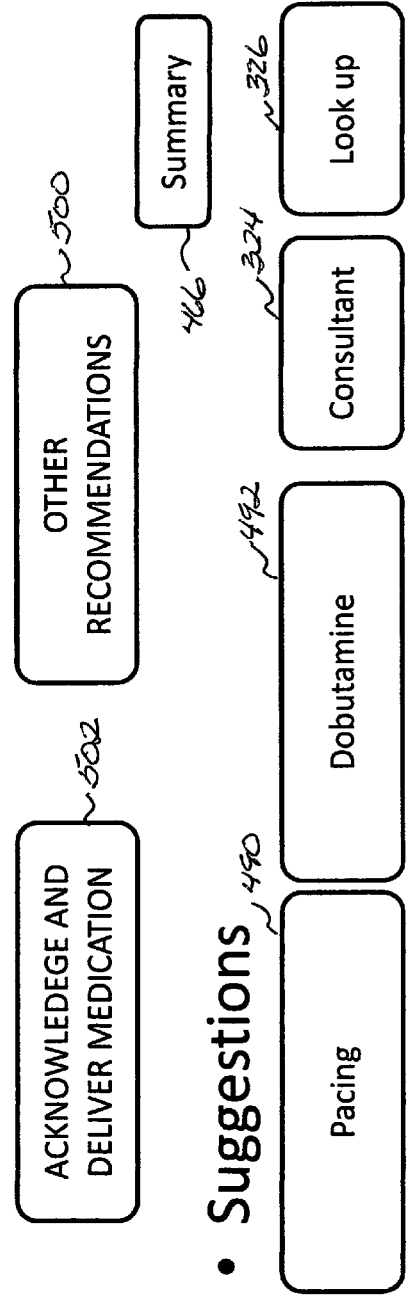

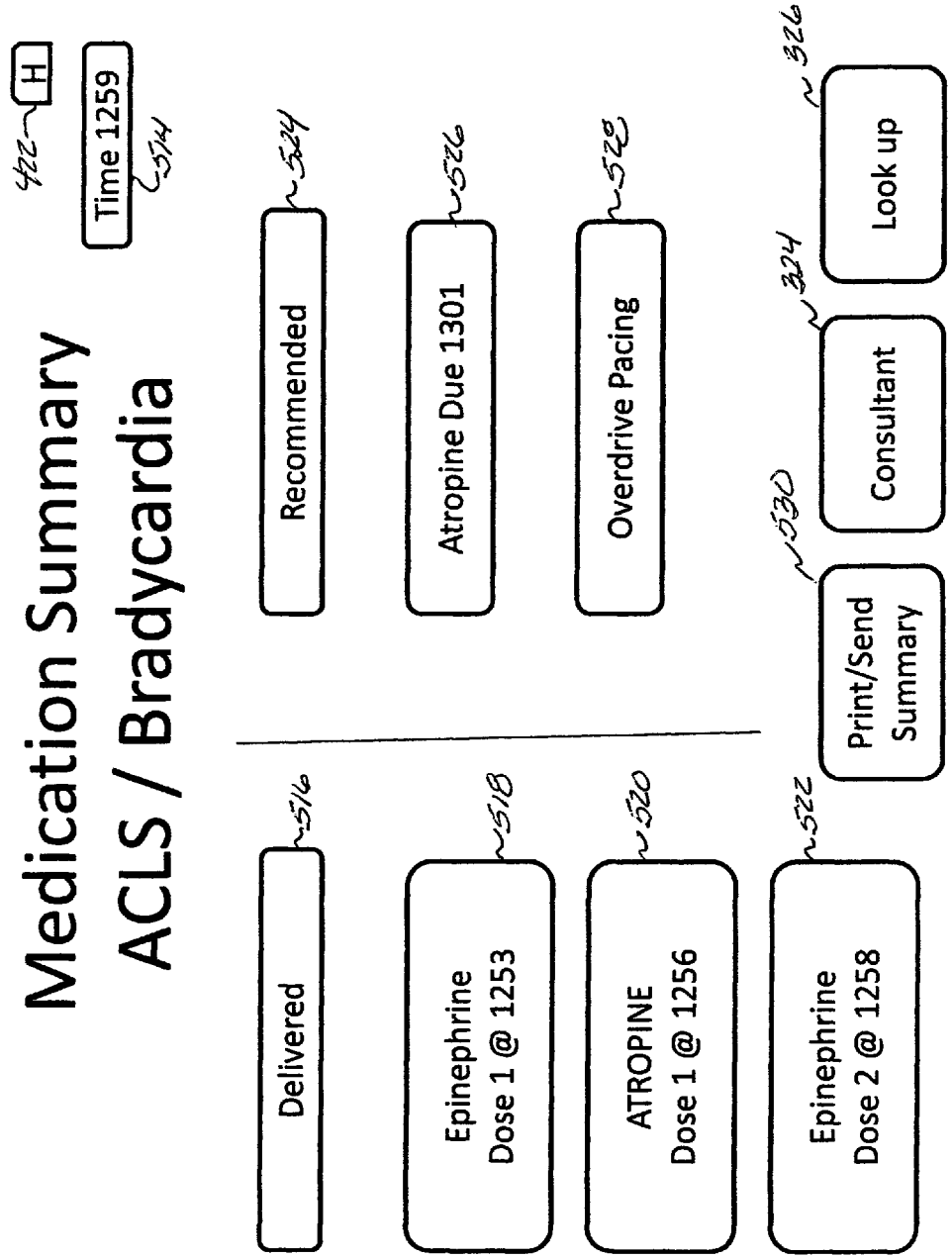

Measured Weight

| 107.6 Kg INCLUDES WT. OF STRETCHER | ~122 |

- Enter stretcher ID or Stretcher Weight

| # | ~126 |
| WT? | ~128 |

- Stretcher ID #
- Stretcher Weight in KG
  – See Label on stretcher
  – Check for alignment and no personnel contact

| Demographics ~130 | Allergies ~132 | Current Medications ~134 |

| Accept ~136 | Modify ~138 |

FIG. 10A

Measured Weight 107.6 Kg INCLUDES WT. OF STRETCHER — 122

- Enter stretcher ID

S127 — 126

- Stretcher ID #
  — See Label on stretcher
  — Check for alignment and no personnel contact

| Demographics | Allergies | Current Medications | |
|---|---|---|---|
| 130 | 132 | 134 | |

Accept — 136    Modify — 138

FIG. 10B

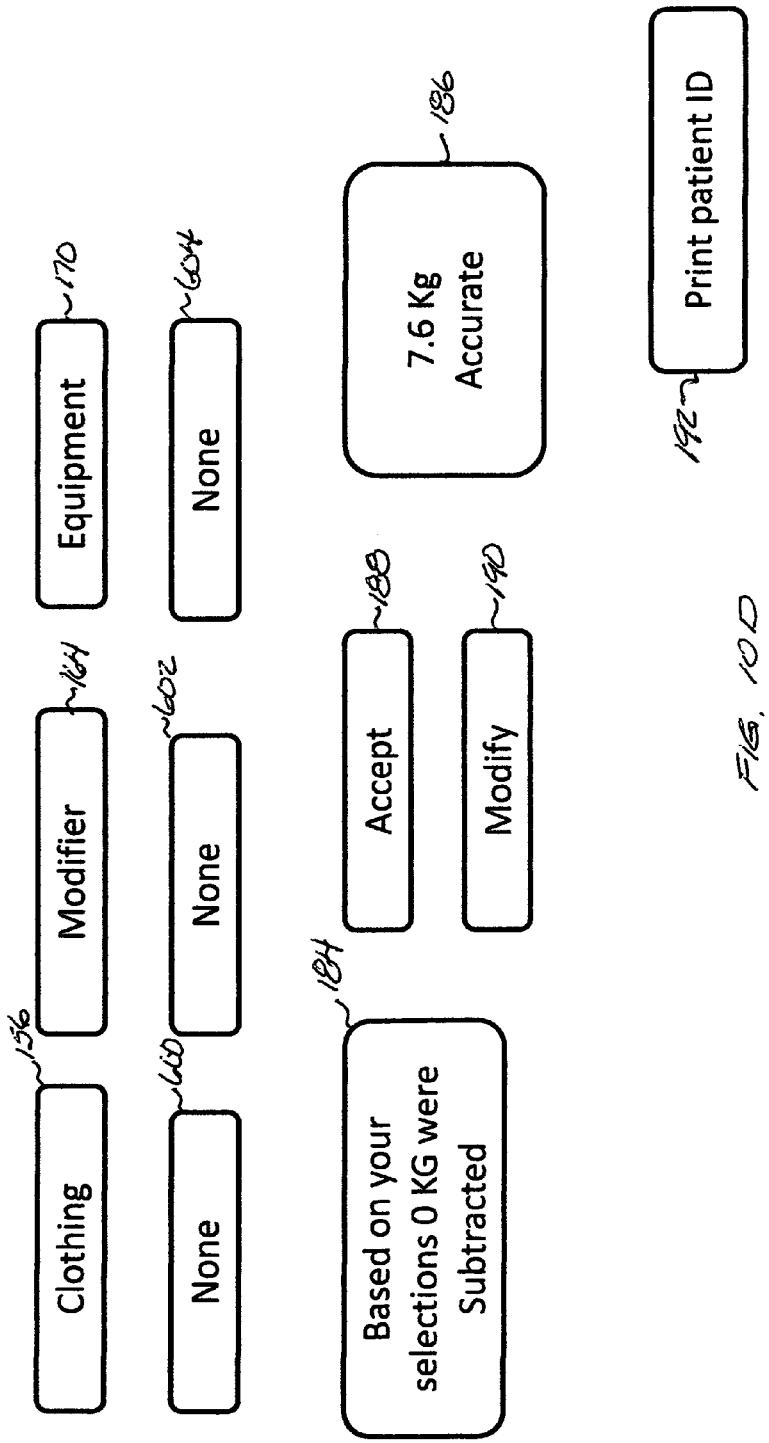

Burns

- Measured total body surface area

[7.6 Kg True patient Wt.] — 608

[H] — 224

Enter Percent 3rd Degree Burn — 606
Enter time of injury — 605

Consultant — 324
Summary — 466
Look Up — 326

Next — 607

FIG. 10E

Burns

- Measured total body surface area 7.6 Kg True patient Wt. ~608

40% 3rd degree ~606

1130 Time of Injury ~609

Fluids ~610

Analgesia ~612

Airway ~614

Consultant ~324

Summary ~326

Look Up ~466

Burns / Fluids

- Measured total body surface area

[40 % 3rd degree] — 609
  [1130 Time of Injury] — 606

- Fluids based on Parkland formula

[7.6 Kg True patient Wt.] — 608
  [1 hour from time of injury] — 616

- 7.6kg*4cc/kg*40=1216cc plus maintenance fluids (Normal Saline Solution)

- Deliver first half of volume over first 8 hours

[H] — 422

[Next] — 618

[Summary] — 466  [Consultant] — 324  [Look Up] — 326

[Return to Burns] — 620

FIG. 10G

Burns / Fluids

- Measured total body surface area

[40 % 3rd degree] ~606

[1130 Time of Injury] ~609

[7.6 Kg True patient Wt.] ~608

[1 hour from time of injury] ~616

- Rate for next 7 hours is 119.8cc/hr
- Includes maintenance rate

[Begin infusion] ~621

[H] ~421

[Summary] ~466  [Consultant] ~324  [Look Up] ~326

[Return to Burns] ~620

FIG. 10H

BURNS
Analgesia

- Morphine
- Fentanyl

722 —[H]

623 — Select
624 — Select

608 — 7.6 Kg True patient Wt.

324 — Consultant
466 — Summary
324 — Look Up

FIG. 10I

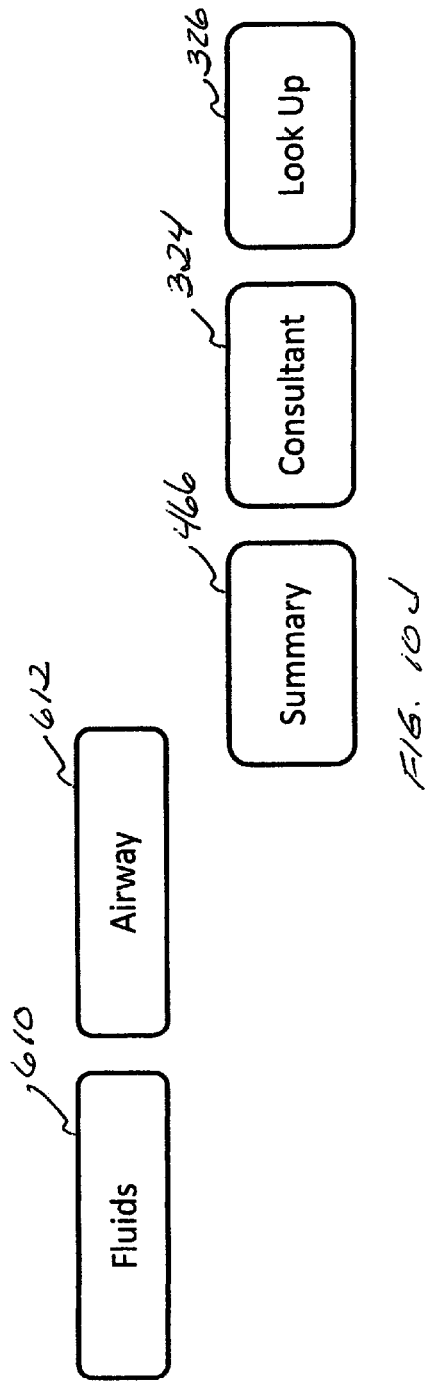

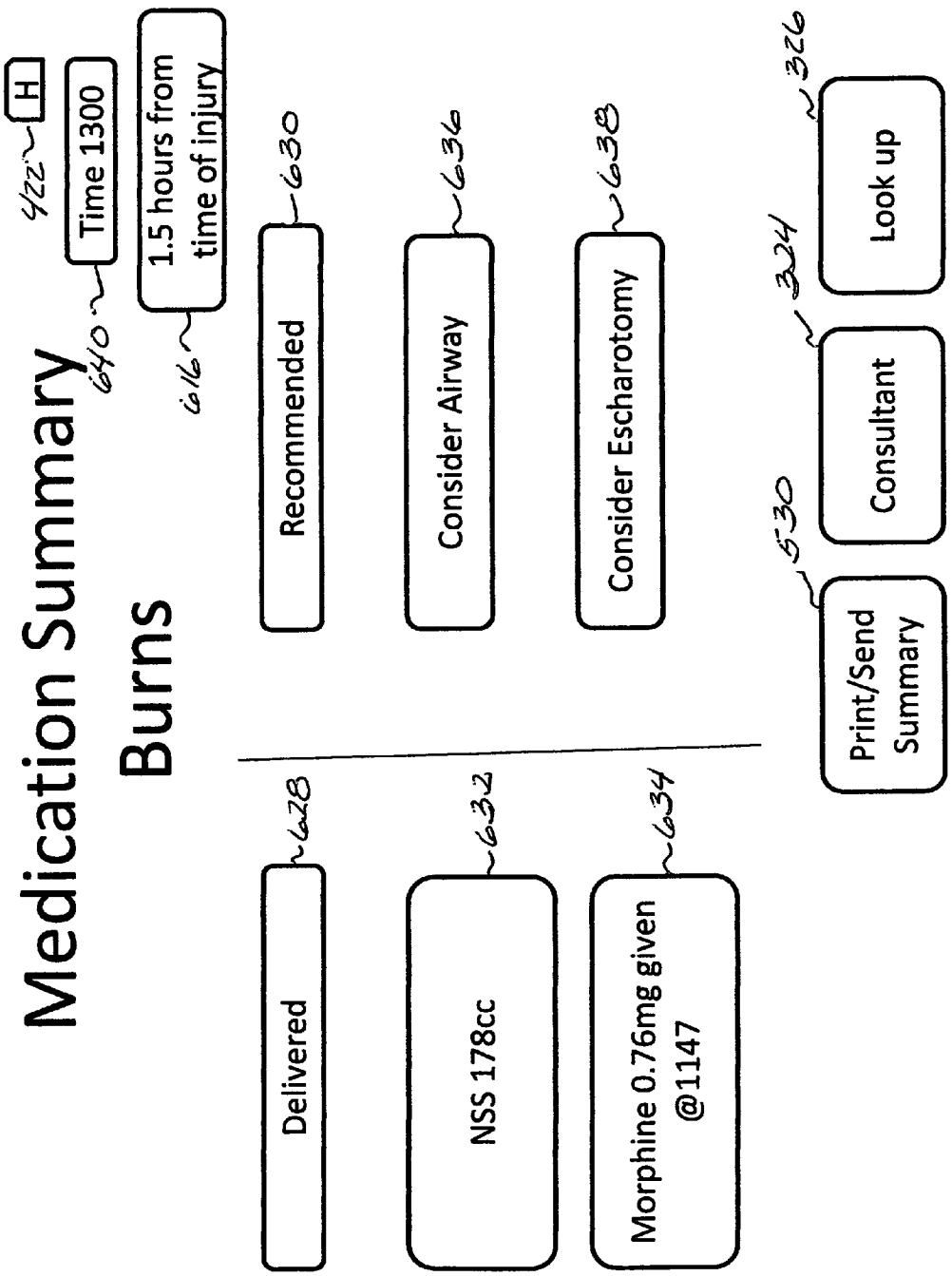

Measured Weight

[Military mode] ~700

[160.3 Kg INCLUDES WT. OF STRETCHER] ~122

- Enter stretcher ID or Stretcher Weight

[#] ~126

[WT?] ~128

- Stretcher ID #
- Stretcher Weight in KG
  - See Label on stretcher
  - Check for alignment and no personnel contact

[Demographics] ~130  [Allergies] ~132  [Current Medications] ~134

[Accept] ~136  [Modify] ~138

FIG. 12A

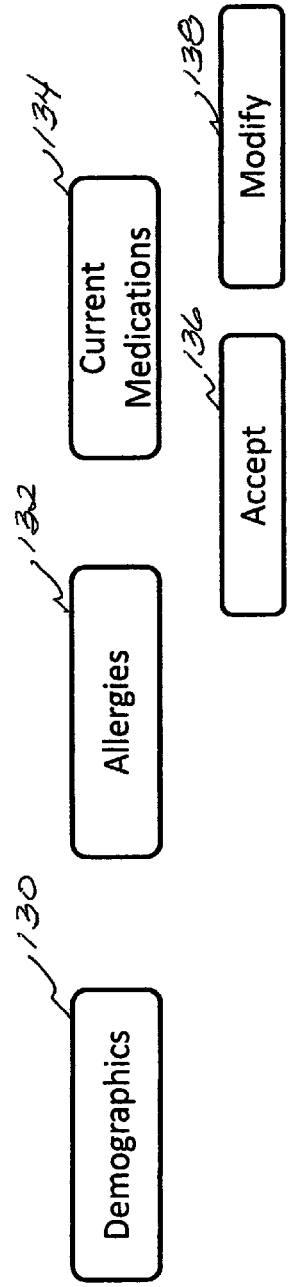

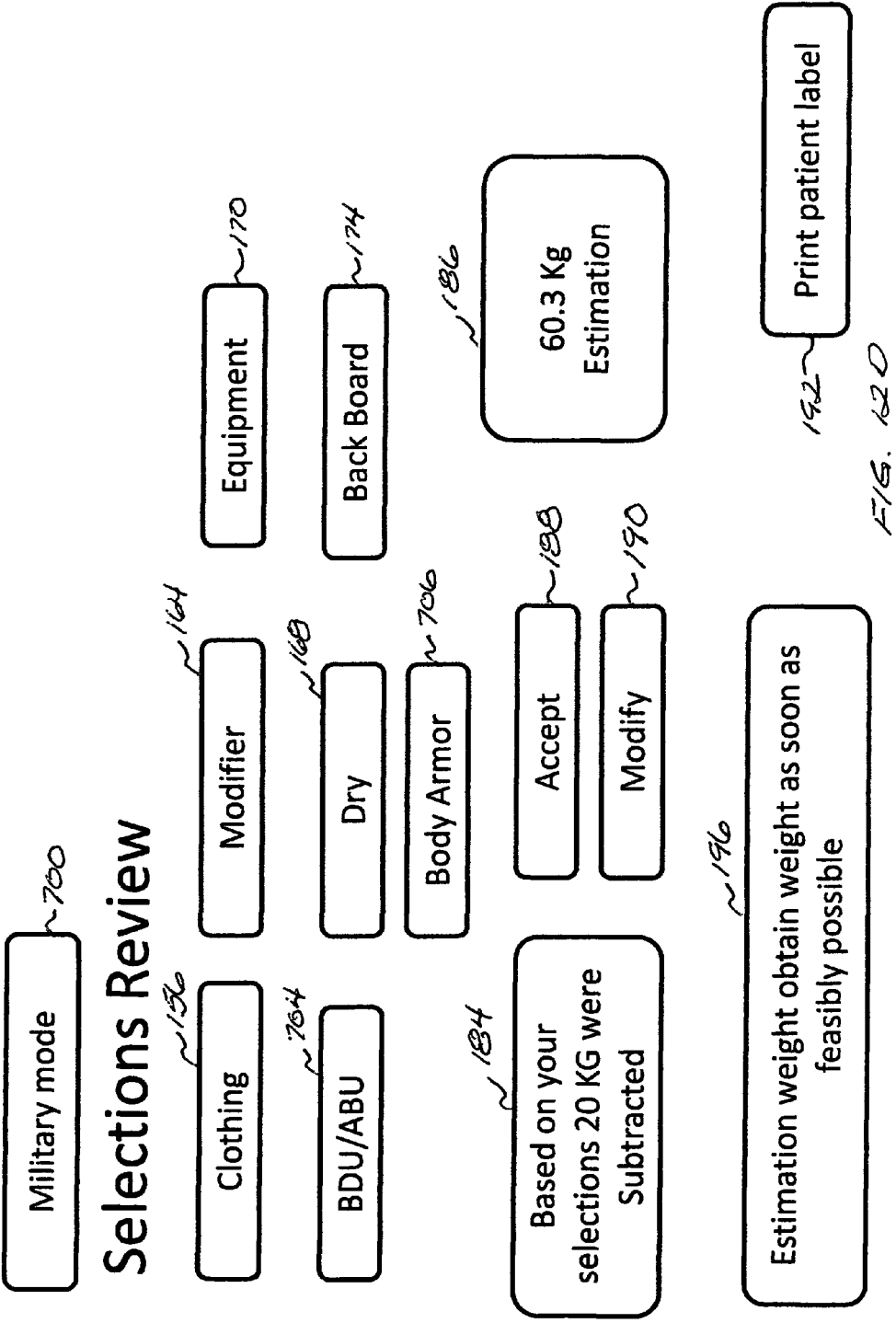

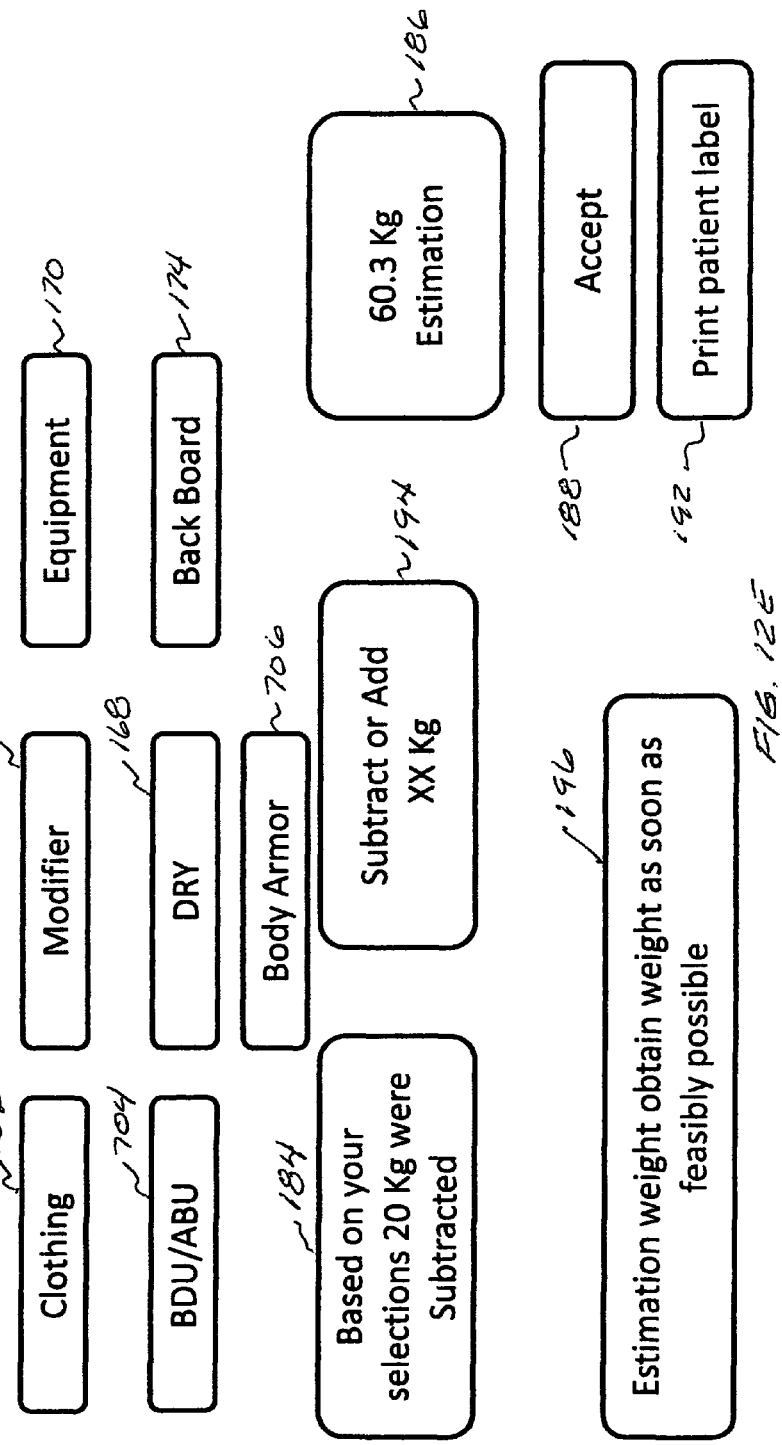

Trauma

422 — [H]

181 — 60.3 Kg Estimation

- Select Category

708 — Airway
  710 — Ventilator
  712 — Fluids
  714 — Blood Products
  716 — Analgesia 196 — Estimation weight obtain weight as soon as feasibly possible

FIG. 12F

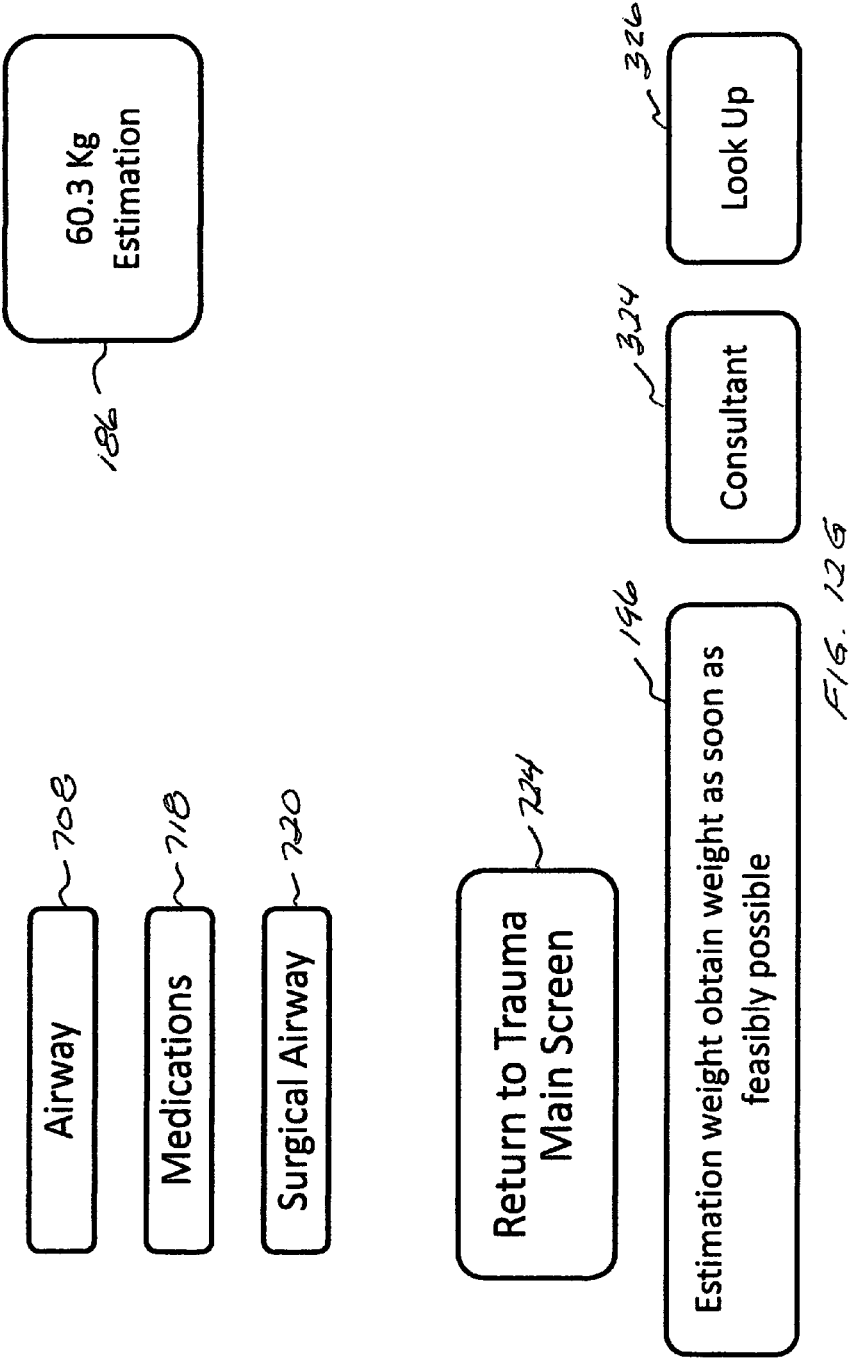

Trauma/Airway/Medications

- Pretreatment

[ Yes ] ~726

[ No ] ~728

[H] ~422

[ 60.3 Kg Estimation ] ~186

[ Consultant ] ~324

[ Look Up ] ~326

[ Return to Trauma Main Screen ] ~724

[ Estimation weight obtain weight as soon as feasibly possible ] ~196

FIG. 12H

Trauma/Airway/Medications 422⟶[H]

- Pretreatment

Lidocaine ⟶730

Vecuronium ⟶732

Return to Trauma Main Screen ⟶724

Estimation weight obtain weight as soon as feasibly possible ⟶196

60.3 Kg Estimation ⟶186

Consultant ⟶324   Look Up ⟶326

FIG. 12I

Trauma/Airway/Medications

- Pretreatment
- Vecuronium 0.01mg/kg
- Based on calculated Wt.
- Deliver 60.3 Kg Estimation Consider Lidocaine Vecuronium 0.60mg IVP Estimation weight obtain weight as soon as feasibly possible Return to Trauma Main Screen Summary Consultant Look Up

FIG. 12J

EMERGENCY PATIENT MEDICATION SYSTEM

FIELD OF THE INVENTION

The present invention relates generally to systems for treatment of patients in emergency environments and more specifically to such systems utilizing computers that permit emergency personnel, doctors in particular, to quickly and accurately formulate treatment protocols including the delivery of appropriate doses of medications to patients who may be incoherent or non-responsive. The system of the invention is particularly useful in situations where the appropriate medications to be administered are ones for which proper dosage amounts are dependent upon the weight of the patient.

BACKGROUND OF THE INVENTION

Emergency medicine, as it is practiced today, can take place in a diverse variety of locations. These include, but are in no way limited to hospital emergency rooms, military field hospitals, in ambulances and medical aircraft, and at the scene of injury or other trauma. For obvious reasons, the amount and type of equipment that is available to the emergency personnel at such locations also varies considerably. However, with the advent of the Internet and availability of networks and wireless communication systems, it is now possible for the emergency personnel to have relatively real time access to many sources of information to assist them in performing their tasks.

A central fact that exists in emergency medicine is that a high percentage of the critically ill patients that arrive at an emergency care facility, such as a hospital's emergency room, are unconscious, confused, demented or otherwise unable to assist the emergency physician in any way. This occurs regardless of whether the patient is the victim of a naturally occurring event such a heart attack or a stroke, trauma, such as a wartime injury, an automobile accident, a sports related injury, or another event, such as a drowning. Also, it is frequently the case that no one else, whether friend or relative, is available to assist the physician by providing meaningful information about the patient, including medical history, currently taken medications, allergies, and the patient's weight. The emergency personnel are, therefore, today required to use primarily only their powers of observation to make determinations, such as the weight of the patient, before setting out to administer life-saving treatments to the patient.

Moreover, due to the critical nature of emergency medicine, the physicians and other personnel are often required to make decisions as to the care to be provided to a patient very quickly and without the ability to consult with others more specialized in treating specific conditions or to consider carefully the potential ramifications of the variety of possible treatments available. Without question, this need to act promptly can cause selections of treatment options to be made that may not always be optimal or even considered.

One of the most powerful weapons that the emergency medical practitioner has today in treating the patients that arrive for care in an emergency department is the scope of medications available that can provide an immediate benefit to the patient. The benefit is that of assisting the practitioner in stabilizing the patient until further diagnosis of the patient's condition can be made and more specific treatment protocols established. These medications range from drugs, such as epinephrine, that stimulate the sympathetic nervous system in cardiac patients to morphine and fluids for burn victims. The failure to administer the proper dosages of such medications to the patient can itself cause problems for the patient. For example, with epinephrine, an inadequate dosage may, in the worst case, cause a failed resuscitation resulting in death. Even when the patient survives, an underdosage may well result in anoxic injury, i.e., injury to the brain and other vital organs due to oxygen deprivation during a cardiac arrest. An overdose of epinephrine, on the other hand, can cause hypertension, tachycardia, cardiac dysrhythmia, cardiac injury and death. See, e.g., Campbell, *Cardiovascular Effects of Epinephrine Overdose: Case Report*, Anesthesia Progress, November-December 1977, at 190-194. Similarly, with the use of morphine to control pain in burn victims, an inadequate dosage may cause unnecessary pain and suffering for the patient. In turn, this can result in abnormal vital signs as the pain can trigger a stress response which could confuse the emergency personnel into thinking that an elevated heart rate is the result of improper fluid resuscitation when, in fact, it is cause by the patient's pain. An overdose of morphine will cause a decrease in blood pressure, respiratory depression or arrest requiring airway management and possibly even death, particularly where the emergency occurs in the field away from modern hospital conditions.

Also, in many emergency situations, there is an immediate need to establish a viable airway to enable the patient to breathe or assist with ventilation while other treatment is being accomplished. For example, with many burn victims, the inhalation of either or both of hot gases and smoke can result in swelling of the patient's airway, either immediately due to injured tissue or later as edema occurs. To accomplish this, the emergency physician uses medications, such as Etomidate and Succinylcholine, to paralyze the patient's airway so that optimal conditions exist for an advanced airway to be inserted between the vocal cords. The amount of Etomidate and/or Succinylcholine that must be administered in order to accomplish this paralysis is closely defined by the weight of the patient. If the dosage applied to the patient is too great, the necessary paralysis is accomplished, but there is a danger that other vital functions of the patient may be affected deleteriously thereby creating a greater risk of the patient not surviving. Conversely, if the dosage is too small, the needed paralysis is not achieved and the patient will fight the insertion of the advanced airway, often resulting in missed or unobtainable airways. Inasmuch as, when accurate patient weights are not known, those weights today are generally nothing more than the best estimates made by the emergency personnel present and are often done under considerable time pressure. Thus, these estimations can be quite inaccurate, particularly in cases where the patient is morbidly obese, an event that is not at all uncommon today, particularly in the United States. While this condition is more frequently seen in urban environments, it is now a fact of life nearly everywhere in this country. Morbidity in the United States continues to increase in prevalence. Predictions in the literature reflect an increase of obesity over the next several decades. See, e.g., Wang et al., *The Obesity Epidemic in the United States—Gender, Age, Socioeconomic, Racial/Ethnic, and Geographic Characteristics: A Systematic Review and Meta-Regression Analysis*, Epidemiologic Reviews, Vol. 29, 6-28 (2007). When this unknown weight estimation is compounded with the often anatomically difficult airway, the likelihood for a failed advanced airway increases significantly. The failure of insertion of an advanced airway, besides resulting in the loss of the time needed to address the underlying life threatening problems, results all too frequently in an adverse event, either a disfiguring and technically difficult surgical airway or, on occasion, death.

In the pediatric setting, the issue is even more critical. Errors of only a few pounds, or in the case of newborns, even just a few ounces, can cause patient weight errors that are many percentage points away from the patient's actual weight. Because mathematical errors in working with young patients can and do occur, which errors can be fatal, see, e.g., Kaushal, et al., *Pediatric Medication Errors: What do we Know? What Gaps Remain*? Ambulatory Pediatrics, Vol. 4, No. 1, 73-81 (January-February 2004), a need for accurately defining the weight of such patients clearly exists. The dangers of the incorrect delivery of medications to young children stem from many sources, including the need to dilute medications standardly prescribed for adults in an undiluted condition and the inappropriate labeling of differing concentrations of medications. Campbell, *Cardiovascular Effects of Epinephrine Overdose: Case Report*, supra. See also, Ornstein et al., *Possible medical mix-up for twins: State is investigating an incident involving actor Dennis Quaid's infants at Cedars-Sinai. Medical overdose is suspected*. Los Angeles Times, Nov. 21, 2007, at B1, where three infants were administered heparin at a dosage 1000 times greater than prescribed for the infants' weights.

Another situation that occurs frequently in emergency departments is what is known as procedural sedation. In this case, a fast-acting and short-lived sedative medication, such as propofol, is given to the patient to sedate the patient only long enough to perform some needed, but painful procedure, such as the reduction of a fracture or the suturing of a wound. Propofol is a weight (and age) dependent medication, the administration of which needs to be carefully calculated and monitored. See, e.g., Milner et al., *Clinical Practice Advisory: Emergency Department Procedural Sedation with Propofol*, Annals of Emergency Medicine, Vol 50, No. 2, August 2007.

However, one of the most perplexing problems that face the emergency personnel in addressing such treatment protocols properly is determining as accurately and quickly as possible, the weight of a patient, particularly when the patient cannot assist in that determination, such as by standing on a scale, because of his or her physical condition. The weight of a patient is important in that many of the medications that ought to be administered to such patients in order to stabilize their condition and keep them alive until further treatment can be administered, are ones where the dosage to be administered is closely dependent upon the weight of the patient. Similarly, particularly in the case of small children, the size of an uncuffed endotracheal tube that may be used on the child and the endotracheal tube per se are, under some formulae, weight dependent, although some formulae use the patient's age for selecting the tube size.

The problem of a patient weight determination when actually weighing the patient is not feasible has several facets, three of which must be addressed always to attain a relatively accurate weight. The first such facet is the general size of the patient. Is the patient a baby, a small child, a teenager or an adult; is the patient slender or obese; and is the patient in possession of all of his or limbs. Secondly, how is the patient clothed. Third, what life support equipment is now associated with the patient. Many other factors may also present themselves in specific situations as well. Presently, the attendant emergency medical personnel must deal with these factors primarily through rapid and subjective evaluations and estimations.

Turning to the first of these factors, this one is of particular importance in the two extremes, young children, particularly babies, and grossly overweight adults. Going initially to the situation with young children, for many years, it has been the standard procedure to use the so-called Broselow color-coded tape system to estimate the weight of a child. This device divides children into several weight categories based solely upon their length and a different color is assigned to each weight category. Then, the Broselow system allows the physician to utilize equipment and to prescribe drug dosages for a child, which drugs and equipment are stored and correlated according to the color on the tape that is associated with the length that the child measures. This tape system assumes necessarily a standardized weight for a child of a specific length. However, in recent times, particularly in urban environments in the United States, it has become known that many children of a given length do not have a weight that corresponds at all accurately to the innate assumptions of the color-coded system on the Broselow tape. Most frequently, such children are from mildly to highly obese for their length, although, in the case of malnourished or otherwise extremely slender children, an over-estimation of their weight may also occur. Hence, the color-coded Broselow system fails frequently to provide accurate estimates as to the medicinal dosages and equipment that are appropriate for the child, usually, because of the underestimation of the child's weight by the Broselow color-coded system. The dosages thus suggested by the Broselow system, therefore, are too low thereby endangering the child at a critical time. Since these determinations are being made when the child is either badly injured or critically ill, an improper application of the drugs or equipment to the child serves to further endanger the child's life. This problem has been discussed at considerable length in Nieman et al., *Use of the Broselow Tape May Result in the Underresuscitation of Children*, 1011-1019 Journal of the Society for Academic Emergency Medicine, 2006. Additionally, the Broselow color coded tape system ends at a standardized weight of 36 kg. Thus, children of a weight greater than this, based upon their assumed weight from their length, are simply left out and are subject solely to a weight evaluation by the attendant personnel. Hence, a need has been demonstrated for a better and more inclusive system for weight determination in young children. The need for an accurate weight determination rather than a subjective estimation is critical during the resuscitation process as well as during the initial care of the critically ill.

Similarly, while many emergency medical personnel are probably quite adept at estimating the weight of those adults who are of relatively normal physical builds, it is very different when the patient is obese. In most emergency departments today, it is not uncommon to encounter patients who weigh upwards of 400 pounds and often much more. In fact, the problem is so great that most hospitals today are forced to have equipment, such as wheelchairs, stretchers or gurneys, and beds, that are designed and built expressly to support such morbidly obese patients. Such individuals' weights are difficult for emergency personnel to estimate accurately and no system for overcoming this critical problem is known to date to exist to assist with these individuals' resuscitations.

A similar situation occurs when the patient is missing one or more limbs, whether by injury or congenitally. This occurs not only in hospital emergency departments, but more frequently in military hospital settings. Such individuals' weights are necessarily less than the comparable weight for an otherwise identical person with all of their limbs and the appropriate dosages of medications for such individuals must correspond to their present weight, which would be less than that which would be prescribed for a like individual with all of his or her limbs. Hence, proper allowances need to be made for such situations.

Patients arriving in the emergency departments come dressed in as many different ways as can be imagined; however, few are completely unclothed. Frequently, because of the nature of the injuries or other condition of the patient, it is either impossible or impractical to remove the clothing before initiating treatment. Most are dressed normally for the ambient conditions. But, even so, how they are dressed can vary very widely. For example, during summer months, one is likely to have patients dressed casually in light clothing weighing only a pound or two, whereas during the winter, particularly in more northerly and southerly regions of the world, people may well be dressed in very heavy clothing weighing many pounds. For obvious reasons, the more voluminous and heavy the clothing worn by a patient, the more difficult it is for the attending personnel to make accurate estimates of the person's actual weight. Also, the patient's occupation may effect the weight of his or her clothing; construction workers typically wear heavy, steel toe reenforced shoes or boots, police officers may have their weapons belts strapped to them and be wearing body armor. Soldiers in combat often have as much as fifty to sixty pounds of equipment on them. Included in this equipment can be a complex system of body armor and ballistic plates that are difficult to remove quickly, particularly in the event of a life threatening injury. Yet, an accurate estimation of the patient's weight may be a critical factor in providing the necessary medical care.

Moreover, the condition of the clothing on the patient can greatly affect their weight upon arrival in the emergency theater. Wet clothing weighs a considerable amount more than does dry clothing. For example, a Minnesota ice fisherman who has fallen through the ice before being rescued is likely to have twenty or more pounds of wet clothing when arriving for emergency treatment.

Finally, there is the question of the weight of equipment that a patient has with him or her upon arrival for emergency care. Very frequently, the patient will be strapped to a back board to prevent him or her from inadvertently moving and causing additional injury. Also, in order to assist the patient in breathing, oxygen may be in use so that the weight of the oxygen bottle and breathing apparatus is present. If bones have been broken or dislocations have occurred, splints or other apparatus to prevent movement of the limb may be in use. The weight of all such equipment must be taken into account when determining the actual weight of the patient.

The need for determining periodically the weight of an individual confined to a hospital bed as a part of an overall treatment protocol has been recognized for some time and a number of devices to accomplish this determination have been suggested. Three such systems are shown in Hasty et al., U.S. Pat. No. 5,393,935, Foster et al., U.S. Pat. No. 5,672,849, and Wilkerson et al., U.S. Pat. No. 7,381,910. Each of the previously disclosed systems has, however, addressed only the situation where the patient is bedridden and the important information is simply whether the patient's weight has changed materially over time. None has addressed the need for weight determinations under emergency conditions when the patient's life is in jeopardy, the patient is not completely undressed, and likely has some life support equipment on or very nearby. Nor has any allowed for a correction of the measured weight of a patient based upon a predetermined and known weight for various items of clothing and or equipment then associated with the patient. Additionally, while the weight of the patient can be determined while the patient is in bed, these systems do not interface with a real time computer system with a data base that can immediately assist the emergency care physician with the care and resuscitation when critically ill nor provide treatment algorithms for suggesting alternative modes of treatment or the potential of dangerous interactions between medications.

Also, it has been recognized that computer systems, networks and the Internet can be utilized effectively in monitoring patients' conditions and directing appropriate care to the patients, including the application of medications. See, e.g., Fu et al., U.S. Pat. No. 4,803,625. However, to the applicant's knowledge, no such computer system has been devised for accurately estimating the weight of an emergency patient and then utilizing that weight to suggest appropriate treatment, as well as the appropriate dosages of drugs and other medications for life saving treatment of emergency patients.

Adverse drug events caused by medication errors represent a common cause of patient injury in the practice of medicine. Many medication errors are preventable and, hence, particularly tragic when they occur, often with serious consequences. The enormous increase in the number of available drugs on the market makes it all but impossible for physicians, nurses, and pharmacists to possess the knowledge base necessary for fail-safe medication practice. Indeed, the greatest single systemic factor associated with medication errors is a deficiency in the knowledge requisite to the safe use of drugs. It is vital that physicians, nurses, and pharmacists have at their immediate disposal up-to-date drug references. Patients who are presented for care in emergency departments are usually unfamiliar to their emergency physicians and nurses, and the unique patient factors affecting medication response and toxicity are obscured. An appropriate history, physical examination, and diagnostic workup will assist emergency physicians, nurses, and pharmacists in selecting the safest and most optimum therapeutic regimen for each patient. Emergency departments deliver care "24/7" and are open when valuable information resources, such as hospital pharmacists and previously treating physicians, may not be available for consultation. A systematic approach to the complex problem of medication errors is needed to help emergency clinicians eliminate preventable adverse drug events and achieve the goal of a zero-defects system, in which medication errors are a thing of the past. New developments in information technology and the advent of electronic medical records with computerized physician order entry, ward-based clinical pharmacists, and standardized barcodes promise substantial reductions in the incidence of medication errors and adverse drug events. Emergency department patients expect and deserve nothing less than the safest possible emergency medicine service. See, e.g., Peth, *Medication errors in the emergency department: a systems approach to minimizing risk*. Emergency Medical Clinics of North America, Vol. 21, No. 1, 141-58, February 2003.

It has been suggested that modern information technology may be a means for resolving many of these errors; however, to date no such systems are available commercially. See, Barker et al., *How can information technology improve patient safety and reduce medication errors in children's health care?*, Archives of Pediatric and Adolescent Medicine, Vol. 155, No. 9, 1002-7, September 2001.

Finally, no known system provides the ability, when used in a hospital environment of creating a real time record of emergency treatment, including all of the medication delivered to the patient which can then be accessible at any time during the patient's continued stay in the hospital, whether within the emergency department or elsewhere.

OBJECTS OF THE INVENTION

It is, therefore, an object of the present invention to provide a computer driven system for the accurate determination of the weight of an injured or critically ill patient rapidly and to thereafter provide suggestions to the emergency personnel as to treatment protocols, equipment, and potentially efficacious medications and their proper dosages.

It is a second object of the invention to provide such a system in which the patient may be of virtually any weight, from a small baby to a grossly obese adult without requiring any modifications to be made to the system.

It is another object of the present invention to provide such a system in which refinements to a scalar weight are made accurately to accommodate for a wide variety of conditions regarding the patient including, but not limited to, the extent and type clothing and footwear being worn by the patient, the condition of that clothing, i.e., is it dry, damp or wet, is it summer or winter weight, and the presence on the platform carrying the patient of any auxiliary equipment that is being used to help stabilize the patient's condition.

It is further object of the invention to provide such a system that will enable the attending emergency personnel to acquire assistance and consultation with an appropriate consultant specializing in an area of treatment needed by the injured or critically ill patient while that consultant is being provided with real time information about the patient's condition and treatment to date.

It is a still further object of the present invention to provide such a system in which information prescribing drugs and/or medications can be directed to a hospital pharmacy or other dispensing agency for immediate delivery in the appropriate dosages.

It is another object of the present invention to prevent overdosages of medications where, despite a patient's weight, a maximum safe dosage of a medication exists.

It is another object of the invention to provide such a system that is flexible and useful in addressing a wide variety of conditions that may be causing the patient to be in critical condition.

It is another object of the present invention to provide such a system in which a summary review of the resuscitation protocol is readily available during resuscitation and in which a time reminder is also readily available during resuscitation to insure that the Acute Life Support System/Pediatric Acute Life Support (ACLS/PALS) algorithm is followed stringently.

It is a still further object of the present invention to provide such a system in which a real time interaction system constantly monitors medications as they are being considered to prevent dangerous interactions from occurring before the delivery thereof to the patient thereby preventing such interactions from jeopardizing the health and care of the patient. The system of the present invention suggests alternatives, if available, and thereby allows the attending emergency physician to consider the risk of that interaction before delivery of a particular medication.

It is another object of the invention to provide monitoring equipment which can interface with the resuscitation equipment to recognize a life threatening event and suggest a treatment algorithm.

It is a further object of the present invention to prepare, at the earliest possible time, a bracelet or other device relating to a patient's identity carrying a barcode or other indicia which, when entered into a hospital's computer system, will access the complete record of treatments provided to the patient during a stay in the hospital and all medications delivered to that patient. In this manner, if at any time during the hospitalization, the patient requires additional emergency treatment, scanning the bracelet will immediately activate the resuscitation station bedside records and afford the treatment team all of the information on previous treatment, ensuring maximum patient safety and greatly reducing the likelihood of medication or treatment error and greatly increasing the patient's likelihood of survival.

It is another object of the present invention to provide such a system into which each event occurring during the treatment of a patient can be entered into an electronic record of the patient's stay in the hospital with each such entry having a time stamp affixed thereto so that a permanent time based record of all such events is maintained and which can be accessed by medical personnel throughout the hospital. In this way, the safety and care of the patient is attained at all times.

It is a still further object of the present invention to provide such a system in which any existing records of the patient at the hospital or other site with access to the computer system to be retrieved and made available to the attending emergency physician.

It is a further object of the present invention to provide such a system in which further algorithms for responding to situations involving terrorism and natural disasters are supplied so that the attending emergency physician can deal more effectively with the emergency situation at hand.

SUMMARY OF THE INVENTION

In view of the foregoing objects of the invention, the present invention in its broadest aspects comprises a system for accurately estimating the weight of a non-responsive, potentially critically ill patient in an emergency care environment. This system comprises one or more computer processors, at least one of which is located in the emergency care environment, the one or more computer processors being programmed to receive information relevant to the patient's weight, including but not limited to the overall weight of the patient and all clothing, transport apparatus, and equipment then associated with the patient. Means are provided for entering into the at least one computer processor in the emergency care environment additional information concerning the nature of the clothing worn by the patient, the identity of the transport apparatus, and each item of equipment then associated with the patient. One or more data bases are operatively associated with the one or more computer processors to provide the information necessary for the one or more computer processors to accurately determine or estimate the weights of all of the clothing, transport apparatus, and equipment then associated with the patient. The one or more computer processors are able to subtract from the overall weight of the patient and all clothing, transport apparatus, and equipment then associated with the patient the weight of the clothing, transport apparatus, and equipment then associated with the patient to accurately determine or estimate the weight of the patient without having to place the patient on a scale.

In another of its preferred embodiments, the present invention comprises a system for accurately estimating the weight of a non-responsive, potentially critically ill patient in an emergency care environment and for monitoring the treatment given to the patient. This embodiment of the present invention comprises one or more computer processors, at least one of which is located in the emergency care environment. The one or more computer processors being programmed to receive information relevant to the patient's weight, including but not limited to the overall weight of the patient and all clothing, transport apparatus, and equipment then associated with the patient. Means are provided for entering into the at least one computer processor in the emergency care environment additional information concerning the nature of the clothing worn by the patient, the identity of the transport apparatus, and each item of equipment then associated with the patient. One or more data bases are operatively associated with the one or more computer processors to provide the information necessary for the one or more computer processors to accurately determine or estimate the weights of all of the clothing, transport apparatus, and equipment then associated with the patient. The one or more computer processors are able to subtract from the overall weight of the patient and all clothing, transport apparatus, and equipment then associated with the patient the weight of the clothing, transport apparatus, and equipment then associated with the patient to accurately determine or estimate the weight of the patient without having to place the patient on a scale. The one or more computer processors have software resident thereon which addresses at least the more frequently encountered medical conditions in the emergency care environment, the software being capable of tracking a preferred protocol for treating each of the frequently encountered medical conditions including the administration of appropriate dosages of drugs or other medications to the patient based upon the determined weight of the patient.

In a further preferred embodiment of the present invention, a system for utilizing the weight of a patient who enters a hospital through the hospital's emergency care environment to define proper dosages of medications and to monitor treatment given to the patient while in the hospital. The system comprises one or more computer processors which are programmed to receive information relevant to the patient's weight from a selected weight data source. A first weight data source includes means for entering into the one or more computer processors additional information concerning the nature of the clothing worn by the patient, the identity of the transport apparatus, and each item of equipment then associated with the patient. One or more data bases are operatively associated with the one or more computer processors to provide the information necessary for the one or more computer processors to accurately determine or estimate the weights of all of the clothing, transport apparatus, and equipment then associated with the patient. The one or more computer processors being able to subtract from the overall weight of the patient and all clothing, transport apparatus, and equipment then associated with the patient, the weight of the clothing, transport apparatus, and equipment then associated with the patient to accurately determine or estimate the weight of the patient without having to place the patient on a scale. A second weight data source comprises a means for determining and entering into the one or more computer processors the patient's exact weight. Means are then provided for entering into the one or more computer processors information relating to all treatment provided to the patient. The one or more computer processors have software resident thereon which addresses at least the more frequently encountered medical conditions in the emergency care environment, the software being capable of tracking a preferred protocol for treating each of the frequently encountered medical conditions including the administration of appropriate dosages of drugs or other medication to the patient based upon the determined weight of the patient.

In view of the foregoing objects, advantages and features of the present invention, the following drawings and more detailed description of the invention will show and describe to one of ordinary skill in the art other objects and advantages of the invention.

BRIEF DESCRIPTION OF THE DRAWING

In the drawing:

FIGS. 3A through 3I are a sequence of exemplary computer screens that are presented serially to the emergency care personnel when processing a new non-responsive, potentially critically ill or injured patient into the emergency patient medication system of the present invention;

FIGS. 8A through 8H are series of screens that are presented serially to the emergency care personnel during an exemplary use of this embodiment of the present invention during the treatment of an obese non-responsive patient suffering from cardiac arrest after collapsing while shoveling snow during a snow storm;

FIGS. 10A through 10K are series of screens that are presented serially to the emergency care personnel during a second exemplary use of this embodiment of the present invention during the treatment of a pediatric patient suffering from severe burns incurred during a house fire;

FIGS. 12A through 12K are series of screens that are presented serially to the emergency care personnel during a third exemplary use of this embodiment of the present invention during the treatment of a military patient who was the victim of an IED explosion which has resulted in bilateral lower extremity amputations above the knee.

DETAILED DESCRIPTION OF THE PREFERRED EMBODIMENTS

Figure 1:
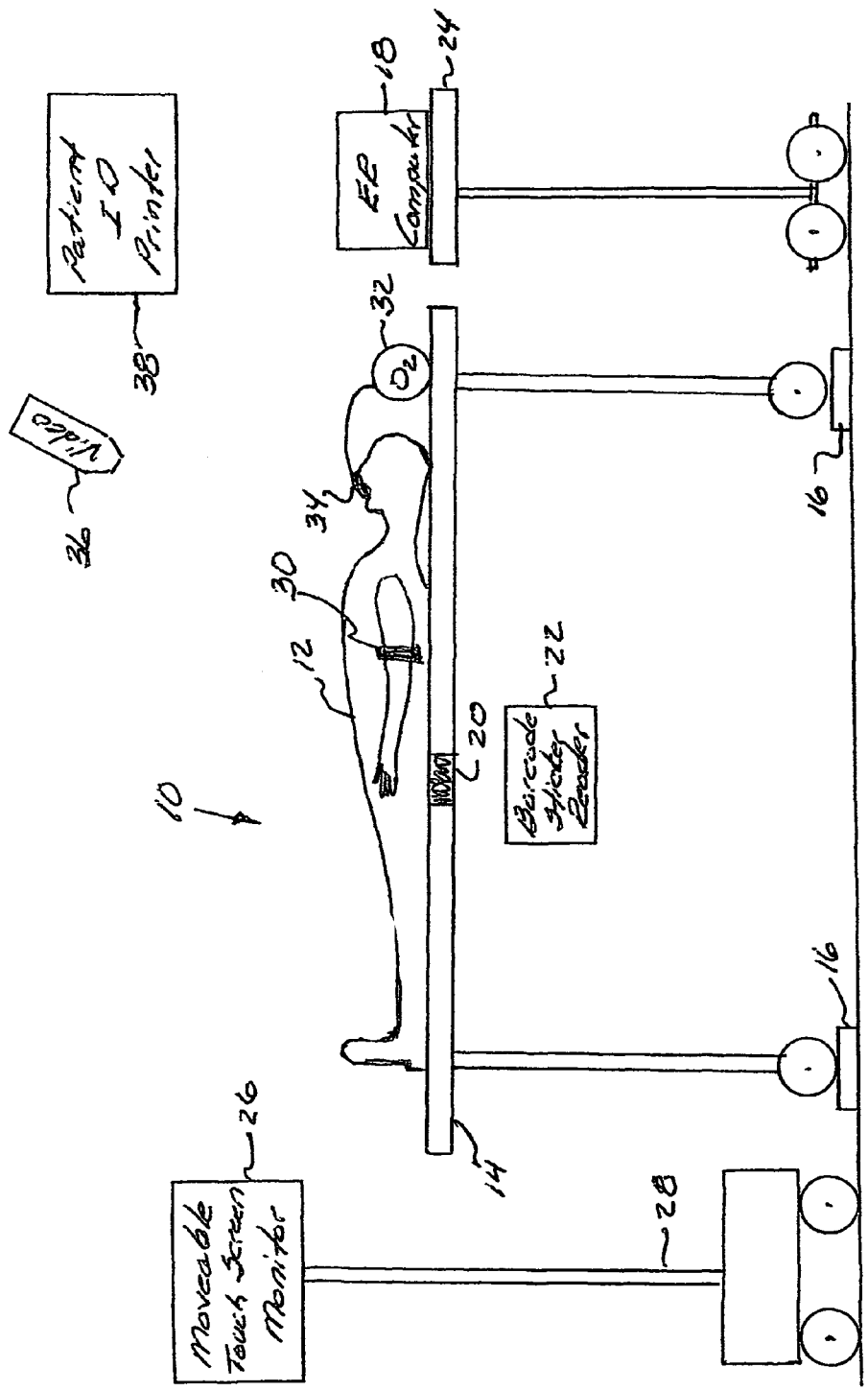
FIG. 1 is a partially schematic diagram of a first preferred embodiment of the emergency patient medication system of the present invention located in a hospital emergency department.

In referring to the accompanying figures of the drawing, like reference numerals will be understood to refer to like elements of the embodiments of the present invention.

Referring initially to FIG. 1, a first preferred embodiment of the present invention is shown in the partially schematic diagram of a emergency patient medication system 10 for accurately estimating the weight of a non-responsive, potentially critically ill patient 12 in an emergency care environment, such as may be found in the emergency departments of many hospitals. The various components of the system 10 may be interconnected by wires or cables; however, it will be understood that any other means by which those components are able to be functionally interconnected so that the appropriate signals and information may pass therebetween is also within the purview of the present invention.

Moreover, while the present invention is being described in the environment of the emergency department of a hospital, it will be appreciated by those of ordinary skill in the art that the present invention may be readily adapted to operate in a wide variety of locations where emergency medicine is to be performed. By way of example only and not by way of limitation, with a satellite telephone or other communication device connected to the system 10, the emergency patient medication system of the present invention may be employed advantageously virtually anywhere in the world, including at or near a battlefield, on shipboard or in an airborne environment.

The patient 12 is shown as having been placed on a patient support 14, such as a stretcher, gurney, or hospital bed. The patient support 14 is in turn resting on one or more receiving platforms 16. The receiving platform 16 includes one or more scales which serve to provide a gross weight of the patient 12 and the patient support 14. The gross weight data produced by the receiving platform 16 is transmitted to an emergency department computer 18. Preferably, the patient support 14 has a weight information sticker 20 on it which provides information concerning the weight of the patient support 14. The weight information sticker can take any of many forms. For example only, it may be a barcode which identifies the specific patient support 14 and/or its weight and can be read by a barcode sticker reader 22. The patient support's weight information is also transmitted to the emergency department computer 18. The sticker 20 might also have the weight of the patient support 14 printed on it, which information could then be input to the computer 18 through a keyboard, voice recognition system or other input device.

The emergency department computer 18 is shown schematically in FIG. 1 as resting on a table 24. However, the computer 18 can be located anywhere and may, for example, simply be a terminal in the emergency department that is a part of the hospital's mainframe computer. It may also be a stand alone computer as would likely be the case where the system 10 is being used in a battlefield environment. Further, the computer 18 may be linked to one or more additional computers through the Internet or by satellite or by radio or other means of communication.

It is within the purview of the present invention that the computer 18 maintains a continuous record of all events that occur during treatment of the patient, both within the emergency department and, subsequently, elsewhere during the patient's stay in the hospital. A feature of that continuous record is the time stamp that the computer 18 applies to each entry into that record. In this manner, whenever the record is reviewed, whether by another physician, a consultant or other medical personnel, a clear record will be available to demonstrate the complete course of treatment, including the times at which the various events occurred, afforded to the patient. Thus, by the maintenance of this record, steps are taken to insure the manner and timing of the care for each patient treated.

One or more monitors 26 are provided in the vicinity of the patient support 14 for displaying information to the emergency medical personnel present. If, as is preferable, the monitor 26 is a touch screen monitor, it becomes a convenient input device for the computer 18. Also, it is preferred that the monitor 26 be mounted on a movable platform 28 so that the monitor may be located in whatever position is most convenient for the emergency personnel while the patient 12 is being treated.

Schematically, a blood pressure cuff 30 is shown on the arm of the patient 12. It is anticipated that, within the scope of the present invention, means, such as the blood pressure cuff 30 and other monitoring equipment, will be employed to monitor the patient's vital signs and feed that information into the computer 18 in real time. Such additional equipment may include, but is not limited to, ECG (electrocardiograph) monitors, pulse oximetry, core or surface temperature, end tidal carbon dioxide, and arterial line pressures.

Also shown schematically in FIG. 1 is an oxygen bottle 32 which is attached to a means 34 for supplying oxygen to the patient 12. The oxygen bottle 32 is carried on the patient support 14 and is included in the gross weight thereof as is determined by the receiving platform 16. The oxygen bottle 32 is exemplary of a wide variety of ancillary pieces of apparatus that may borne into the emergency department on the patient support 14, including back boards, splints, blankets, and the like, and which then become part of the gross weight information measured by the receiving platform 16.

As will be explained in greater detail below, a video camera 36 may be provided to record the course of treatment of the patient 12. Preferably, the video camera is also located on a movable platform so that it can be positioned so as to best record the treatment being provided to the patient 12. Finally, with respect to FIG. 1, a patient identification generator 38 is provided so that, at an appropriate time, a patient identification bracelet or other indicia can be created for the patient. While it is most likely at this time that such an identification label will include a unique barcode that identifies the patient and provides access to the patient's medical hospital records as will be explained in greater detail below, it is within the purview of the invention that other means might also be sued to accomplish the identification and record access functions. These include embedded microchips and magnetic strips as well as any other such means that may be developed in the future.

Preferably, such an identification bracelet or other indicia is created and affixed to the patient 12 as early in the treatment process as is reasonably possible. It is also preferable that the bracelet have a barcode or other machine readable indicia thereon. It is within the purview of the present invention that this barcode enable anyone within the hospital system to access the full record of the treatment afforded to the patient during the hospital stay and to have the various protections provided by the system 10 of the present invention as will become apparent from the following discussion. In other words, the bracelet with its barcode will afford the patient continued protection effectively from the time of entry into the hospital until the moment of the patient leaving the hospital.

Figure 2:
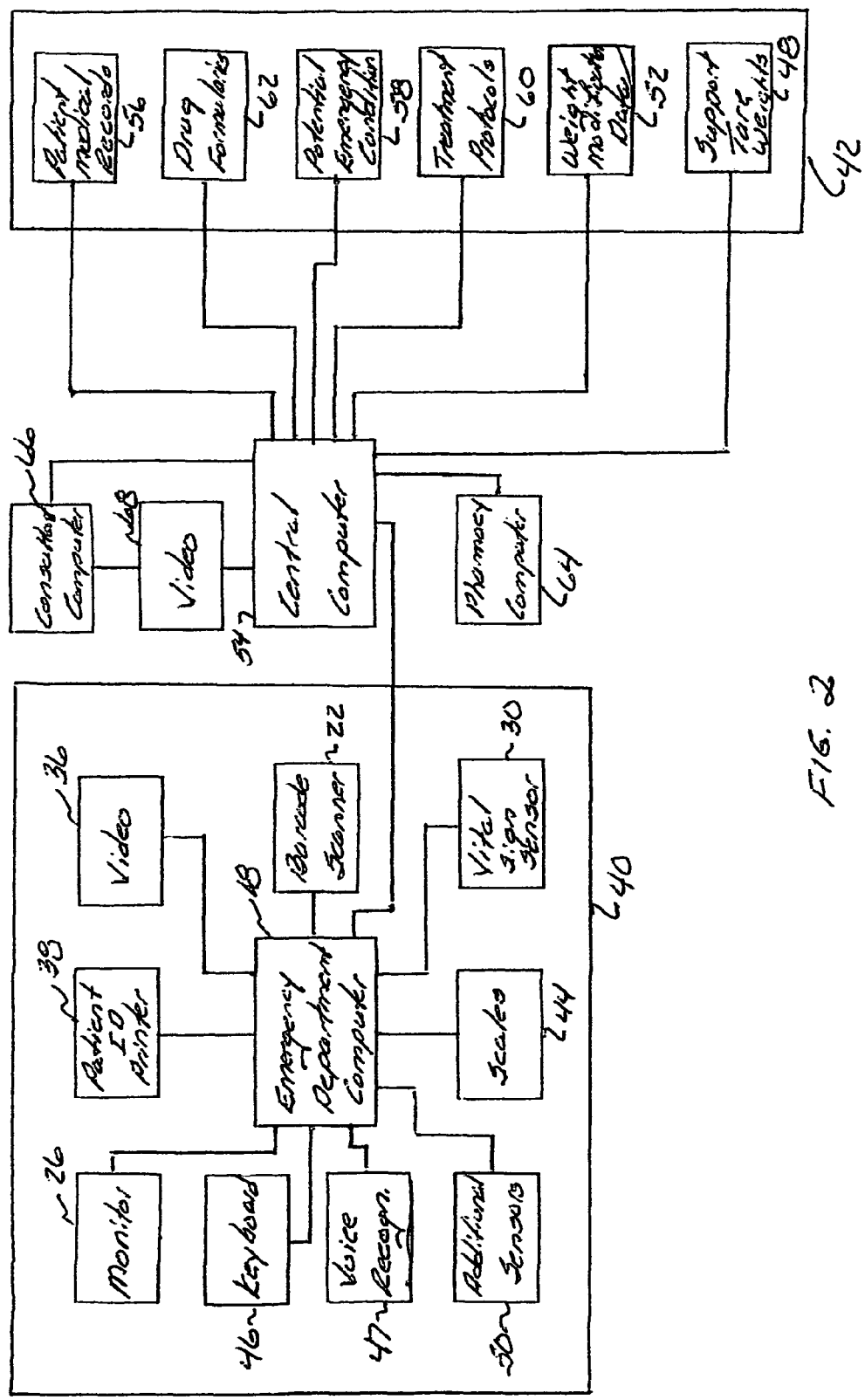
FIG. 2 is a block diagram showing the principal components of the patient medication system of the present invention.

Turning next to FIG. 2, it is a block diagram of the first embodiment of the present invention as is shown in FIG. 1. The system 10 is comprised generally in its broadest aspects of an emergency environment module 40 and a database module 42. The central component of the emergency environment module 40 is the emergency department computer 18. The computer 18 has the algorithms according to the present invention resident on it. The computer 18 need not, however, be physically located in the emergency department, it may be anywhere that permits it to be operationally associated with the other components to be described, at least most of which are located in the emergency department. Similarly, the database module 42 may be located on a drive in the computer 18; but also may be located separately so long as the data stored on that database module can be retrieved whenever needed. Also, it is within the purview of the present invention that some portions of the database module 42 may be stored on the computer 18 and other portions stored elsewhere.

More specifically, the emergency department module 40 preferably comprises a number of associated components that cooperate with the computer 18 to perform the operations of the present invention. Included in these components are one or more scales 44 which are located on the receiving platform 16, the output of which is fed into the computer 18 to supply a gross weight for the patient 12, the patient support 14, the clothing worn by the patient 12, and any equipment, such as the oxygen tank 32, that may be physically on the patient 12 or the patient support 14. Two of the additional components found in the emergency room module serve to provide means for entering data into the computer 18 for the purpose of subtracting from the gross weight supplied by the scales 44, the weights of all other things that may be present on the patient 12 or the patient support 14. These are a barcode scanner 22 or other device that is capable of recognizing a specific piece of emergency equipment, such as a particular stretcher or gurney 14, oxygen tank 32, back board, or other equipment that is being used with this patient upon arrival in the emergency department. As noted with respect to FIG. 1, such weight information stickers 20, such as barcodes or identification numbers, may be placed on individual pieces of equipment after they are carefully weighed. This foreshortens the process for determining the patient's likely weight. If no such weight information stickers 20 are available for any piece of equipment associated with the patient 12, a keyboard 46 or other input device such as a mouse, the touch screen monitor 26, or a voice recognition module 47, is available to permit emergency department personnel to enter the identification of all of the equipment found on the patient 12 or the patient support 14. The computer 18 is then able to retrieve standardized weight data from a table of patient support and other tare weights 48 in the database module 42 for each such piece of equipment.

Lastly, the emergency environment module 40 may include a variety of sensors for monitoring the condition of the patient 12, such as the vital signs sensor or blood pressure cuff 30 and additional sensors 50, the type of which may depend upon the condition of the patient 12 upon arrival in the emergency department.

Next, because very few patients arrive in the hospital emergency department totally unclothed, the keyboard 46 or other input device, such as the touch screen monitor 26, is used to input data about how the patient is dressed and the condition of that clothing. The database module 42 includes a table of weight modification data 52 which comprises standardized data for various types of clothing and footwear as well as data concerning whether that clothing and footwear is dry or wet. Thus, by inputting information about the nature and type of clothing and footwear, the system 10 provides standardized modifications of the gross weight determined by the scales 44 so as to arrive at a statistically accurate determination of the true weight of the patient 12 without having to place that patient on a scales or to make any subjective approximations.

As noted previously, the database module 42 can be disposed on the computer 18; however, in most hospitals, it is likely that the database module 42 will be associated with the hospitals central computer system 54. While it is not uncommon for patients to arrive in a hospital's emergency department without any identification or without any other person who can identify the patient, more frequently, at least some minimal identification information for the patient is available. If that information is entered into the computer 18, the system 10 can check the hospital's records to determine if the patient 12 has ever been treated or admitted to the hospital previously. Such information is also stored in the database module 42 as patient medical records 56. Such information, if present, may include highly relevant data, such as allergies of the patient to certain medications and medications routinely taken by the patient.

In addition, the database module 42 contains a wide array of information about the various conditions that the emergency personnel are likely to encounter. This information is represented in FIG. 2 by the potential emergency conditions table 58, the treatment protocols table 60, and the drug and other medication formularies table 62. Once the patient's weight has been determined using the equipment and methodology of the present invention, all of the calculations regarding the correct dosages of those medications to be administered to the patient are accomplished within the system 10. By so doing, the system of the present invention greatly reduces the likelihood that significant errors will be made in the administration of drugs and other medications to the patients that arrive in the emergency department. In order to further facilitate the proper administration of drugs and other medications to patients in the emergency department, the system 10 feeds the information about the appropriate dosages to a computer or terminal 64 in the hospital's pharmacy so that such dosages can be made immediately available to the personnel in the emergency department.

FIG. 2 also shows schematically a consultant's computer 66 and an associated monitor 68. By so doing, the system 10 provides the ability to feed the realtime data and video about the condition and treatment of a patient to a consulting physician or other specialist at a location remote to the emergency department, whether within the hospital or elsewhere, such as a professional office. By this means, the emergency personnel on the scene with the patient can consult with others who have greater experience and expertise in a particular area rather than having to improvise in the emergency department. In this way, the treatment afforded to a patient is improved. While this feature of the present invention is of considerable value in a hospital's emergency department, it is potentially of far greater value when the theater in which the patient is being treated is located remotely, such as a small rural hospital, a clinic, or in a military field hospital where, otherwise, no such realtime consultation would be feasible. With modern Internet and satellite communications, such consultations are now feasible virtually anywhere in the world and at any time.

Estimated Patient Weight Determination

Figure 3A:
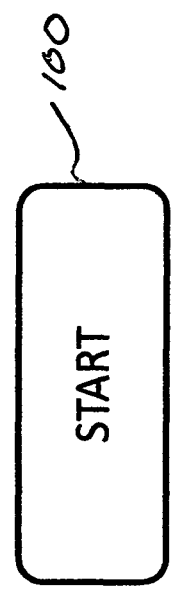
Figure 3B:
Figure 3C:
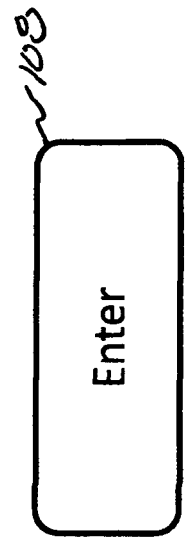
Figure 3E:
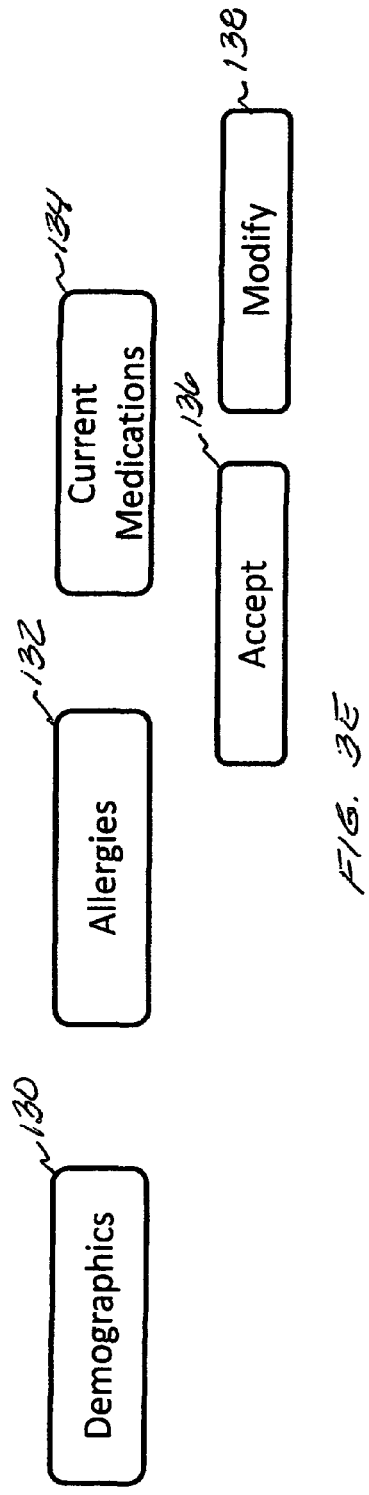
Figure 3F:
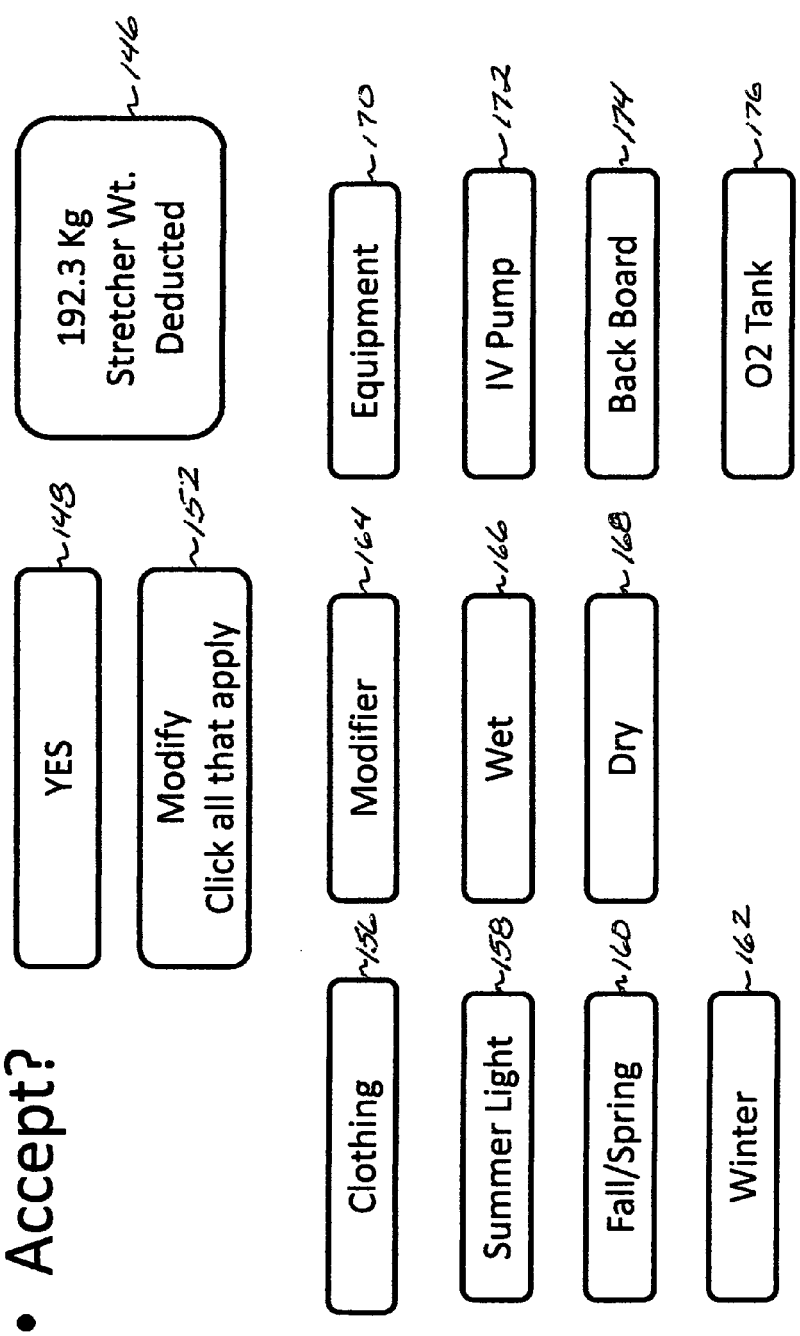
Figure 3I:
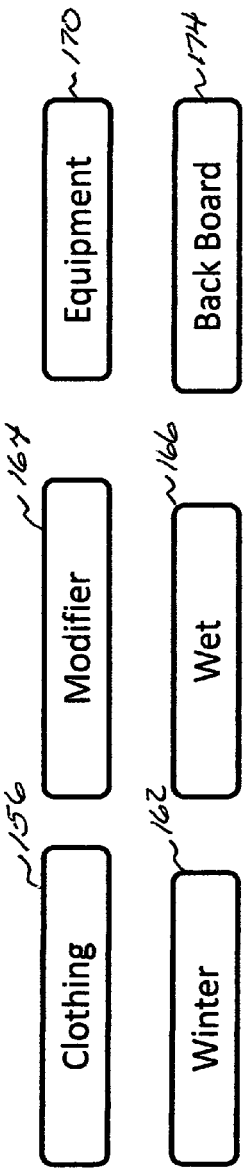
Figure 4A:
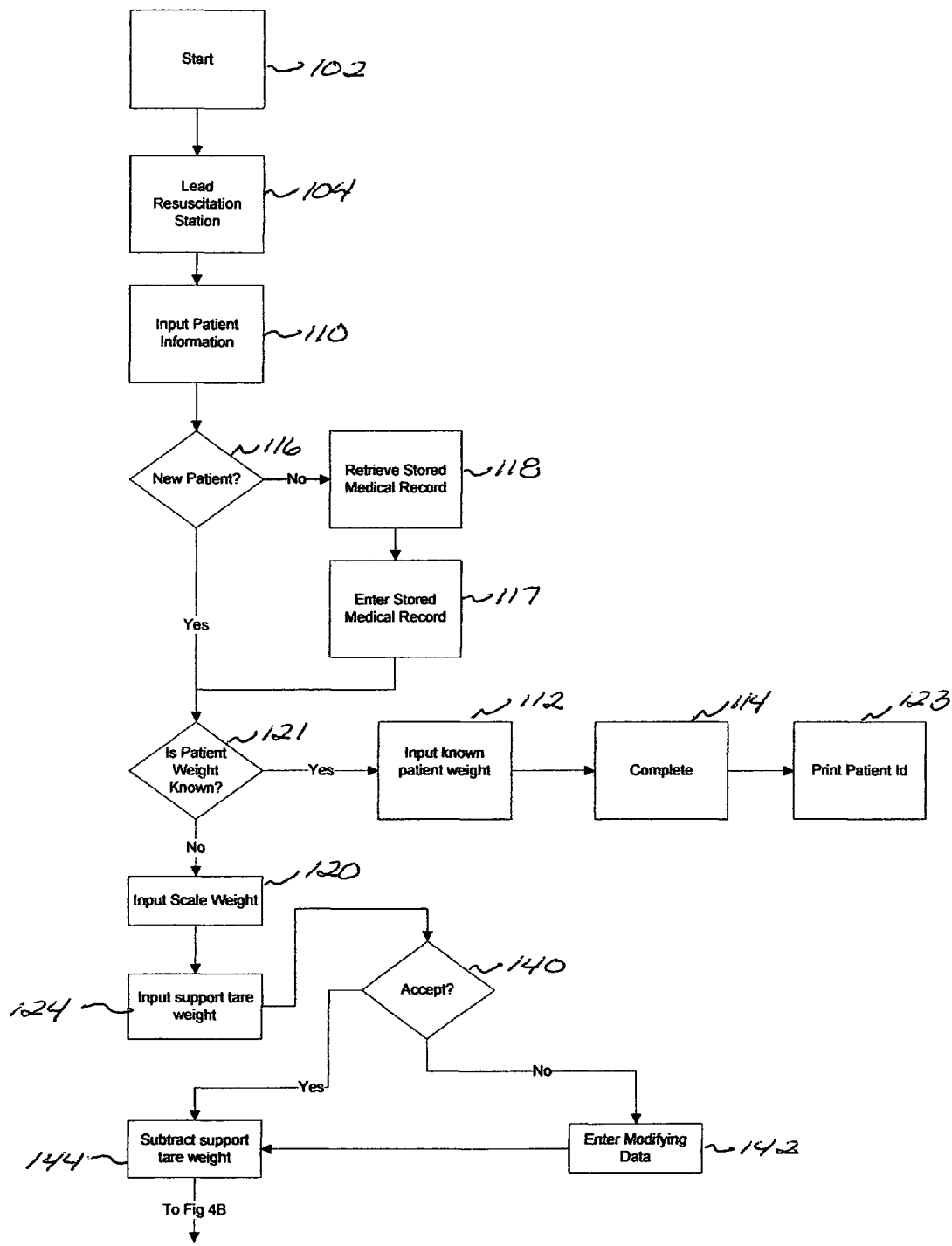
FIGS. 4A and 4B are flow charts depicting the process through which an accurate determination or approximation of the weight of an injured or critically ill patient is determined without having to weigh the patient directly.

Turning next to the series of computer screens found in FIG. 3 and the associated flow charts in FIG. 4, the initial screen which is presented on the monitor 26 is the "Resuscitation Station" screen is shown in FIG. 3A and includes the "START" button 100 which an emergency medical person initiates by touching the screen of the monitor 26 upon arrival of a patient in the emergency department. This commences the operation of the system 10 at step 102 in FIG. 4A by loading the resuscitation station system 10 into the emergency room computer 18 at step 104 which causes a second "Resuscitation Station" screen shown in FIG. 3B to appear. At this time, if the identity of the patient is known, that information is also entered into the system 10 at step 110. The patient medical records 56 in the database 42 are then queried at step 116 to determine if such records exist for the patient 12 and, if such records exist, that information 118 is entered into the computer 18 at step 117. This information is important to the emergency personnel treating the patient because it may identify to them pre-existing medical conditions, medications that the patient may be taking and/or allergies, all of which can affect the selection of medications and treatment utilized to care for the patient.

In the screen of FIG. 3B, the emergency personnel are asked whether the patient's weight is known. If the weight of the patient is known, whether learned from the patient, another person accompanying the patient, or by the patient having been weighed prior to becoming non-responsive, the button 106 is activated on the screen which causes a third "Resuscitation Station" screen as set forth in FIG. 3C to appear through which the emergency department personnel enter the known weight by actuating button 108 and then entering the information using the keyboard 46 or other input device. In flow chart of FIG. 4A, this is indicated by the inquiry at 121 as to whether the patient's weight is known, followed by the step of indicating the input of the patient's weight data if known in step 112 and the "Complete" step box 114. At the time, as indicated the patient ID 38, see FIG. 1, is activated to produce a patient identification bracelet or other indicia according to standard hospital practices at step 123.

If, however, the patient's weight is not known as is frequently the case, the "Calculate Weight" button 119 in the screen of FIG. 3B is used which, in turn causes the "Measured Weight" screen of FIG. 3D to appear on the monitor 26. In this case, as soon as the patient 12 on the patient support 14 is brought into the emergency department, the patient and patient support are placed on the receiving platform 16 and the gross weight of the patient, patient support and all ancillary equipment on the patient support is determined in step 120 and is displayed in window 122 on the monitor 26. The weight of the patient support 14 is then entered in step 124, either by entering the number of the support 14, its weight via the keyboard 46, by scanning the weight information sticker 30, or by retrieving standardized information for the type of support 14 from the support tare weight table 48 in the database module 42. When accomplished, the stretcher or other patient support's identification number appears in window 126 and its weight in window 128.

The screen of FIG. 3D may also provide some additional information to the emergency personnel, such as looking for a label on the patient support 14 and checking to insure that the patient support 14 and the receiving platform 16 are properly aligned and that no emergency personnel are in contact with the patient 12 or the patient support 14 so that the gross weight information acquired is accurate. Also, a series of buttons is provided at the foot of the screen in FIG. 3D to permit the emergency personnel to either access the patient's prior medical information if that has been retrieved from the database module 42 or to enter any additional pertinent medical information that is known relating, for example, to demographics 130, allergies 132 and current medications 134. Then, the emergency physician has the option to "Accept" the displayed information or to "Modify" it in some way using buttons 136 and 138, respectively on the screen of FIG. 3D. Generally speaking, unless it is seen that some error has occurred in the entry of the information concerning the patient support 14, the "Accept" button 136 will be activated in step 140 If modifications are made in step 142 to the tare weight of the patient support 14, those modifications are brought into a calculation of the gross weight of the patient, i.e., the scale weight less the weight of the patient support in step 144.

Entry of the stretcher weight information in the screen of FIG. 3D causes the screen of FIG. 3E to appear. This screen is much like that shown in FIG. 3D, except that the identification number of the stretcher now appears in window 126. This affords the emergency personnel an opportunity to verify that the correct stretcher has been identified. Assuming that the patient is clothed, the "Modify" button 138 is now activated which then calls up the "CALCULATED PATIENTS Weight" screen of FIG. 3F.

Figure 4B:
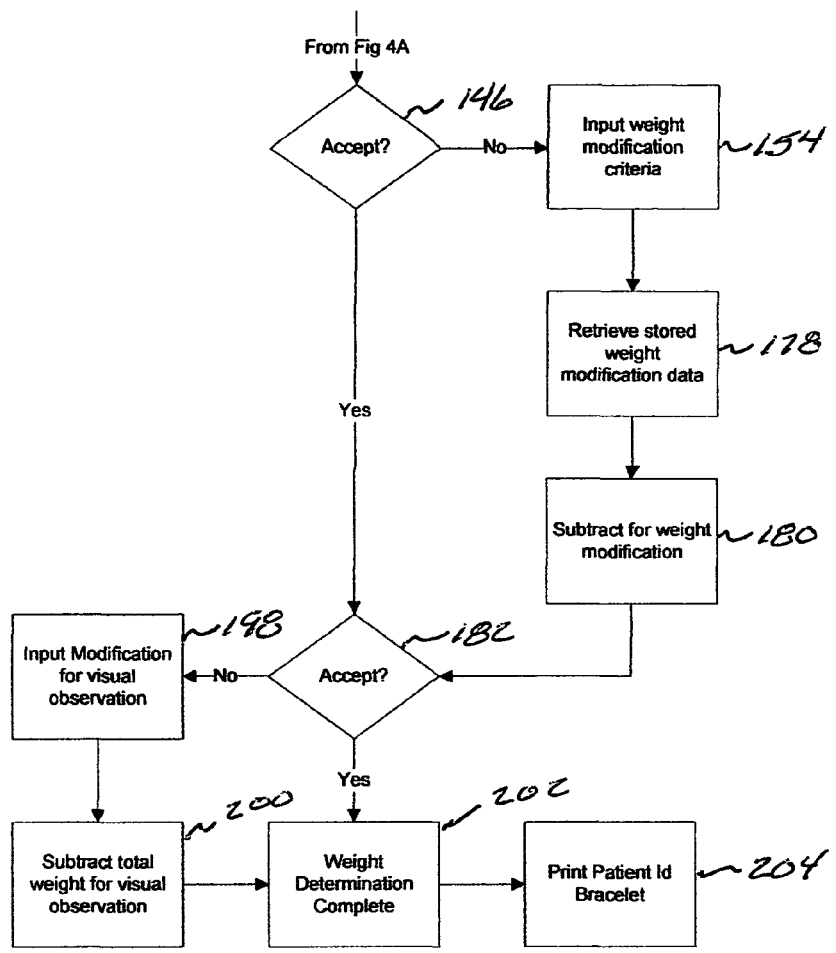

In the "CALCULATED PATIENT'S WEIGHT" screen of FIG. 3F, and the continuing flow chart of FIG. 4B, the initial query made is whether to "Accept" the calculated patient gross weight of step 144, as is now shown in window 146 in FIG. 3F as the patient's weight. This would be the case if the patient is wearing little or no clothing and no additional equipment is present on the patient support 14. If so, the "YES" button 148 is touched in step 150. Generally speaking, however, this condition does not often occur. Rather, the norm is that the patient is clothed and some equipment has been placed on the patient support 14 by emergency medical service personnel prior to the patient reaching the emergency department. Therefore, the "Modify" button 152 is touched in step 150. Then, in step 154, the emergency personnel are offered an array of buttons in the screen of FIG. 3F on the monitor 26 to describe as succinctly as possible the nature of the modifications that need to be made to the patient's gross weight as calculated in step 144 to reach as accurate a determination of the patient's true weight as possible without having to actually put the patient on a scale. As shown in FIG. 3F, the first column of buttons deals with clothing and the seasonal differences between clothing that a person might wear during the different seasons. As such, button 156 is touched to indicate that the patient is clothed and thereafter, the succeeding buttons are "Summer Light" 158, "Fall/Spring" 160, and "Winter" 162. The middle column presents a potential modification to the clothing types shown in the left column. A "Modifier" button 164 is shown to indicate that a modification to the nominal clothing weight needs to be made. Below it are "Wet" and "Dry" buttons 166 and 168, respectively. As is obvious, wet clothing weighs more than dry clothing; hence, the system 10 provides for assigning different weights to such wet and dry clothing. The "Dry" button 168 is provided to indicate that clothing that would ordinarily be assumed to be wet, such as swimwear, is actually dry. Finally, the right column is a series of buttons that may be utilized to identify the types of equipment that may be located on the patient support 14 at the time that the patient support is placed on the receiving platform 16. Here, the upper button 170 is presented to allow the emergency personnel to indicate that some "equipment" is present on the patient support 14. Exemplary types of such equipment are represented by the succeeding buttons "IV Pump" 172, "Back Board" 174, and "O2 (Oxygen) Tank" 176. Once all of the modifiers in FIG. 3F that are applicable to a specific patient are actuated, the "Modify" button 152 is again touched to indicate to the system 10 that the listing of modifiers is now complete. This causes the screen of FIG. 3G to appear on the monitor 26.

Persons of ordinary skill in the art will recognize that the series of buttons shown on FIG. 3F are merely exemplary and that numerous other buttons could be included on this screen. For example only, the type of footwear worn by the patient could well be used on this screen as footwear can vary considerably in weight, a pair of flip-flops or sandals are quite different from heavy work boots or ski boots. Also, the nature of clothing worn during the winter in various regions can be quite different. Moreover, when the system 10 is used in a military setting, the nature of the clothing, protective wear and armament can be very heavy relative to the weight of the patient and must be addressed at this point in the process of using the system 10. Similarly, the "Wet" and "Dry" categories could be expanded to address finer gradations of moisture remaining in the patient's clothing.

The weight modification criteria that are activated through the screen of FIG. 3F are input to the computer 18 in step 154 as shown in FIG. 4B. Then, based upon the criteria activated, the appropriate data is retrieved from the weight modification table 52 in the database module 42 in step 178. This data is then entered into the emergency department computer 18 and subtracted from the weight determined in step 144 in step 180. The resulting weight determination is then proffered to the emergency department personnel for potential acceptance in step 182.

The screen for the acceptance or rejection of the weight determination of step 180 is shown in FIG. 3G, a "Selections Review" screen. In this screen, the weight criteria modifier buttons activated on the screen of FIG. 3F, e.g., the "Clothing" button 156, the "Winter" button 162, the "Modifier" button 164, the "Wet" button 166, the "Equipment" button 170, and the "Back Board" button 174, are carried forward and are again present. The remaining buttons that were not activated on the screen of FIG. 3F are not shown in the screen of FIG. 3G.

Additionally, two weight related boxes are provided in the screen of FIG. 3G. First, box 184 shows the weight that has been subtracted as a result of the weight criteria modifier buttons that were activated and box 186 is provided to show the patient weight that has been determined as a result of the process of the system 10 to date. Because the weight determination process of the system 10 must always be subject to the acceptance of the emergency personnel, "Accept" and "Modify" buttons 188 and 190, respectively, are provided to permit those personnel either to accept the determination shown in box 186 or to reject it. If the determination in box 186 is accepted via button 188, button 192 may be activated to print a patient identification label, e.g., a bracelet, which may include the weight determination that has been made. It should also include a barcode or other scannable indicia that identifies the patient. As is explained in greater detail below, this identification label can then be used at any time during the patient's hospital stay to access the complete record of the events occurring during the hospital visit.

If, however, the "Modify" button 190 is activated, the "CALCULATED PATIENTS WEIGHT MANUAL MODIFY" screen shown in FIG. 3H is presented on the monitor 26. At this time, the emergency personnel are able to enter a subjective correction using, for example, the keyboard 46. The correction so entered is then presented in window 194, and appropriate modifications are made to the data shown in windows 184 and 186. The button for printing a patient identification label 192 is again present as is an "Accept" button 188.

Finally, for the "Calculated Patient's Weight" embodiment of the present invention, the "Review" screen shown in FIG. 3I is provided. The information provided on this screen is very similar to that of the screen of FIG. 3H. The only modifications are that window 186 now clearly reflects that the calculated weight is only an estimation and new window 196 reminds the emergency personnel that the patient continues to need to be weighed as soon as feasible to determine the precise weight.

Returning next to the flow chart of FIG. 4B, it is shown that, after the "Accept" step 182, if the emergency personnel elect to subjectively modify the calculated patient weight, in step 198, that subjective weight modification is made and that modification is then subtracted from the calculated patient weight in step 200. Thereafter, regardless of whether a subjective modification has been made by the emergency personnel or not, the weight determination becomes final in step 202 and a patient identification bracelet or other indicia is printed in step 204. This final step 204 is also shown following the completion of the weight determination in FIG. 4A where the patient's weight is known.

The remainder of the detailed description of the present invention will be presented through a series of examples of its operation. It would be virtually impossible to provide the appropriate computer screens that could be generated to show the operation of the system 10 under every potential set of circumstances that might be encountered in an emergency department or military hospital. Therefore, it is believed that these examples demonstrate adequately to show a person of ordinary skill in this art how to make and use the invention. Additional examples are believed to be superfluous and would serve no useful function.

EXAMPLE 1A

In order to demonstrate the operation of the weight determination embodiment of the system of the present invention, the following example is presented. An obese middle aged male has been found unresponsive and in cardiac arrest. There are no witnesses or medical history available. He apparently collapsed while shoveling during a snow storm. He is soaked thoroughly from the elements and is dressed in full winter attire. He is transported to the emergency department of a hospital on a stretcher and is supported on a back board.

Upon the patient's arrival in the emergency department on the stretcher, his weight is unknown and he has no previous records at the hospital. The system 10 is initiated by touching the button 100 as shown in FIG. 3A. The screen of FIG. 3B appears and the "Calculate Weight" button 119 is activated since the patient's weight is unknown. The stretcher is weighed on the scales 16. The resulting gross weight, as shown in window 122 in FIG. 3D, is 297.3 kilograms. The stretcher number is then entered via the keyboard 46 of the emergency department's computer 18 and the "Modify" button 138 is touched. The screen shown in FIG. 3E appears and again the "Modify" button 138 is touched bring up the screen of FIG. 3F. FIG. 3F shows in window 146 that the patient's gross weight, before deductions is 192.3 kilograms as the weight of the stretcher, 105 kilograms, has been deducted from the overall gross weight.

The attending emergency physician can now either accept the resulting weight for the patient by touching the screen in the "Accept" button 148 or elect to modify that weight by touching the "Modify" button 152. Because the patient is clothed, those clothes are wet and a back board is present, button 152 is touched as are the appropriate buttons for "Clothing" 156, "Winter" 162, "Modifier" 164, "Wet" 166 and "Back Board" 166. This results in the "Selections Review" screen of FIG. 3G appearing. This screen indicates that the selections in windows 156, 162, 164, 166, 170 and 174 were made on the screen of FIG. 3F. Window 192 indicates that, based upon those selections, an additional 20 kilograms of weight has been subtracted from bringing the patient's estimated weight for the patient down to 172.3 kilograms as shown in window 186.

When the "Accept" button 188 is touched, the "Print patient ID" button 192 is enabled and, upon being touched, a patient wrist bracelet with a system specific barcode is printed for the patient. This barcode enables anyone in the hospital system to access the patient's treatment history virtually instantaneously so that the patient is protected by this record throughout his stay in the hospital. If it is decided, for some reason that is observed by the emergency personnel present with the patient and which are not addressed by the noted selections, that some further modification of the patient's weight need to made, when the "Modify" button 190 is touched and the screen of FIG. 3H would appear. In that case, the physician could touch button 194 and then enter a further modification of the patient's weight based upon those subjective evaluations. For example, in instant situation, if the patient is wearing extremely heavy boots or if the amount of moisture retained in his clothes appears to be inadequate, it would be appropriate to enter a further subjective modification to accommodate this observation. In either case, the screen of FIG. 3I then appears as a summation of all of the data and information entered previously.

Selection of Treatment Protocol

Figure 5:
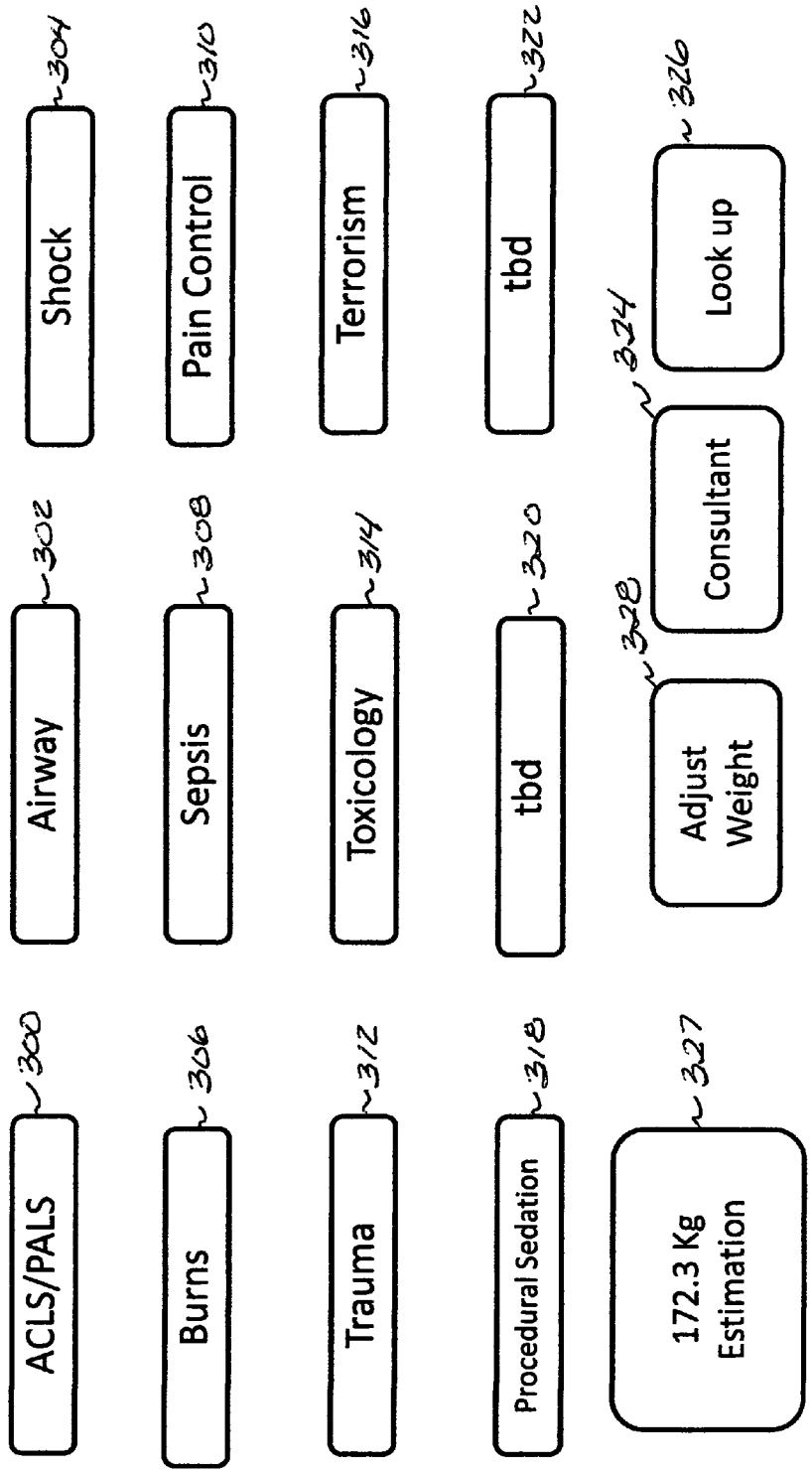
FIG. 5 is an exemplary screen that is presented to the emergency care personnel when commencing to treat the non-responsive, potentially critically ill or injured patient whose weight has been determined or estimated in accordance with the procedures described with respect to FIGS. 1 through 4, in which the emergency care personnel select the apparent condition of the patient for further treatment.

Once the patient's weight has been determined according to the procedure described above, the "Home Screen/Select Category" screen of FIG. 5 appears on the monitor 26. As is demonstrated below, whenever a patient's condition changes, one of the options that the treating physician has available is to return to this "Home Screen" in order to be able to again select a treatment category, which may be the same as the one previously used or may differ depending solely upon the circumstances presented. This "Home Screen" allows the treating physician or other emergency professional to select, based on all of the information available, the most likely protocol to use to successfully treat the patient. The content of this screen is merely exemplary and could be modified extensively to include as wide a variety of emergency conditions as is appropriate in the particular theater in which the system 10 is being utilized. For example, the conditions presented on the screen in a large general hospital would vary considerably from those in a military hospital in a battle zone. Similarly, the conditions presented are likely to be different between those used in an inner city hospital in a major metropolitan area and at a small rural hospital.

The buttons provided on the screen of FIG. 5 are "ACLS/PALS" (Advanced Cardiovascular Life Support/Pediatric Advanced Life Support) 300, "Airway" 302, "Shock" 304, "Burns" 306, "Sepsis" 308, "Pain Control" 310, "Trauma" 312, "Toxicology" 314, "Terrorism" 316, "Procedural Sedation" 318, and two "tbd" (to be decided) buttons 320 and 322 to permit other situations to be added as and when needed. By selecting one of the buttons for initiating treatment, the emergency physician is then able to access those portions of the database module 42 that are germane to the protocol selected. Finally, two additional buttons are provided on the screen of FIG. 5. The first is the "Consultant" button 324. This button allows the emergency physician to access another health care professional who is more expert in a particular field of interest to enable the treating physician to acquire virtually immediate assistance in formulating the precise treatment protocol for the patient. Depending upon the system's capability and access, the consultant could be in the hospital containing the emergency department, another nearby hospital, or at a remote location. As will be repeatedly noted below, this button will be present on all screens that may appear hereafter.

The second such button in the screen of FIG. 5 is the "Look Up" button 326. This button serves to permit the emergency physician to access a wide variety of materials both within the system 10, such as medical journal articles and other data found within the hospital's computer archives, including hospital records, and outside the hospital system via the Internet or other networks to which the hospital has access. In this way, the emergency physician can access any outside materials that may be useful to the treatment of the patient. Thus, through the use of buttons 324 and 326, the emergency physician can have access to a wide scope of professional advice and materials to assist in providing the best possible care to the patient. This includes, but is not limited, journal articles or clinical procedural references. Additionally, the "Look Up" function allows the emergency physician to access any medication in the pharmacy database 62. If the physician elects to use a medication, the resuscitation station system 10 automatically checks for interactions with other medications previously used with the patient and calculates the correct dosage for a given patient weight, thereby eliminating the potential for a serious drug interaction or a mathematical miscalculation. Finally, a window 327 shows the weight estimation that has been made of the patient and an "Adjust Weight" button 328 appears on the "Home Screen" of FIG. 5. The presence of this button permits the treating physician to make further adjustments in the calculated or known weights determined and entered in to the system 10 during the discussion above regarding FIGS. 3 and 4 as the result of subsequent events that have been encountered during the treatment process. For example only, if a patient involved in an automobile or industrial accident is required to have a limb or a portion thereof amputated, the patient's weight changes and this must be addressed in the system 10 so that proper treatment and medication dosages are provided. When the button 328 is activated, the system 10 returns to the screen of FIG. 3H so that an appropriate adjustment can be made.

Figure 6:
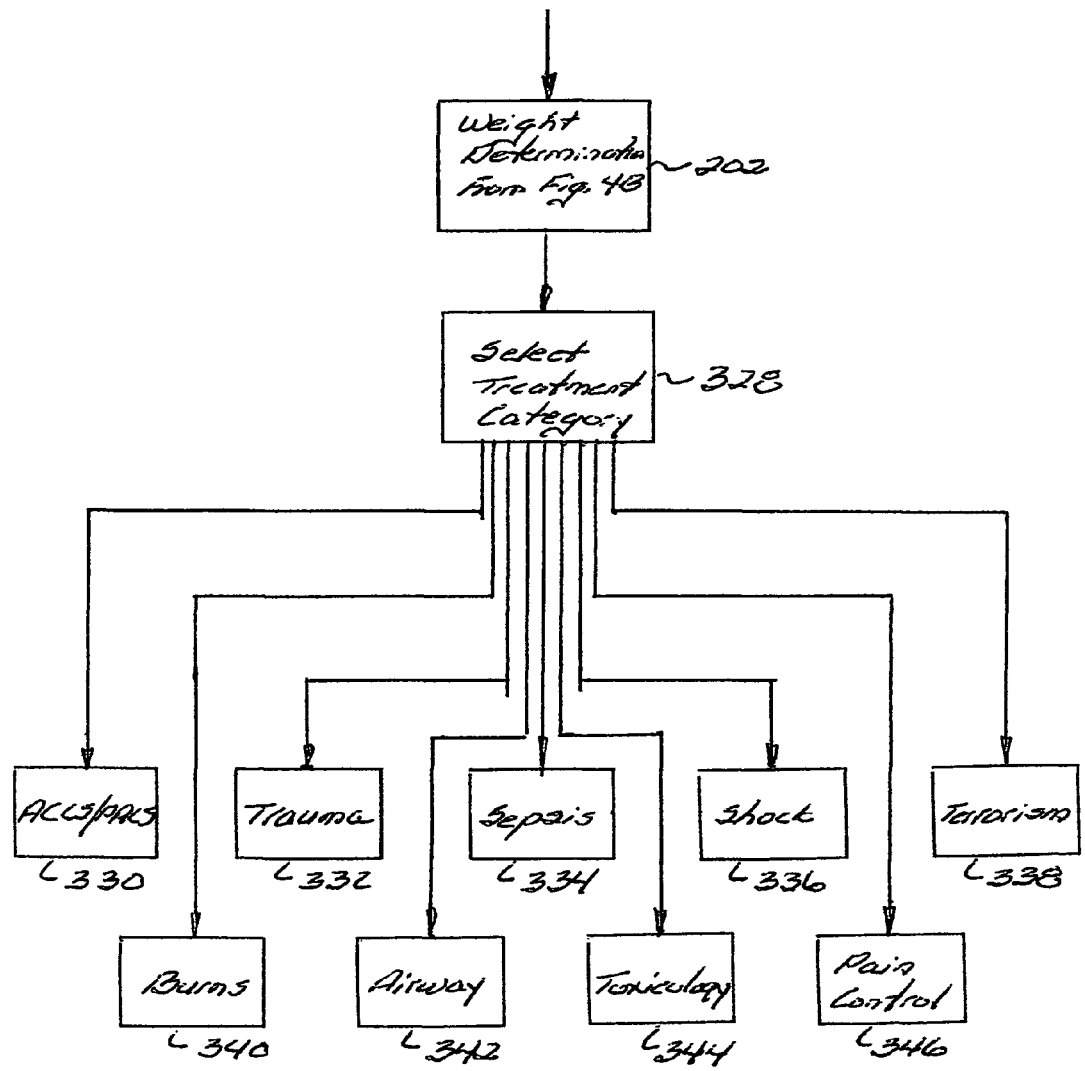
FIG. 6 is a flow chart corresponding to the screen shown in FIG. 5 showing a selection of treatment protocols that could be utilized in the system of the present invention and available to the emergency care physician following the determination or estimation of the patient's weight in accordance with the procedures described with respect to FIGS. 1 through 4.

FIG. 6 is a simplistic flow chart depicting the selection process presented by the screen shown in FIG. 5. As indicated, the patient weight determination either 114 or 202 is followed by a requirement to select a treatment protocol event 328. The available selections, which correspond directly with the buttons in the screen of FIG. 5 are "ACLS/PALS" 330, "Trauma" 332, "Sepsis" 334, "Shock" 336, "Terrorism" 338, "Burns" 340, "Airway" 342, "Toxicology" 344, and "Pain Control" 346. Again, as with the buttons shown in FIG. 5, the events shown in FIG. 6 are merely exemplary of those that might be addressed during the operation of the system 10.

Figure 7:
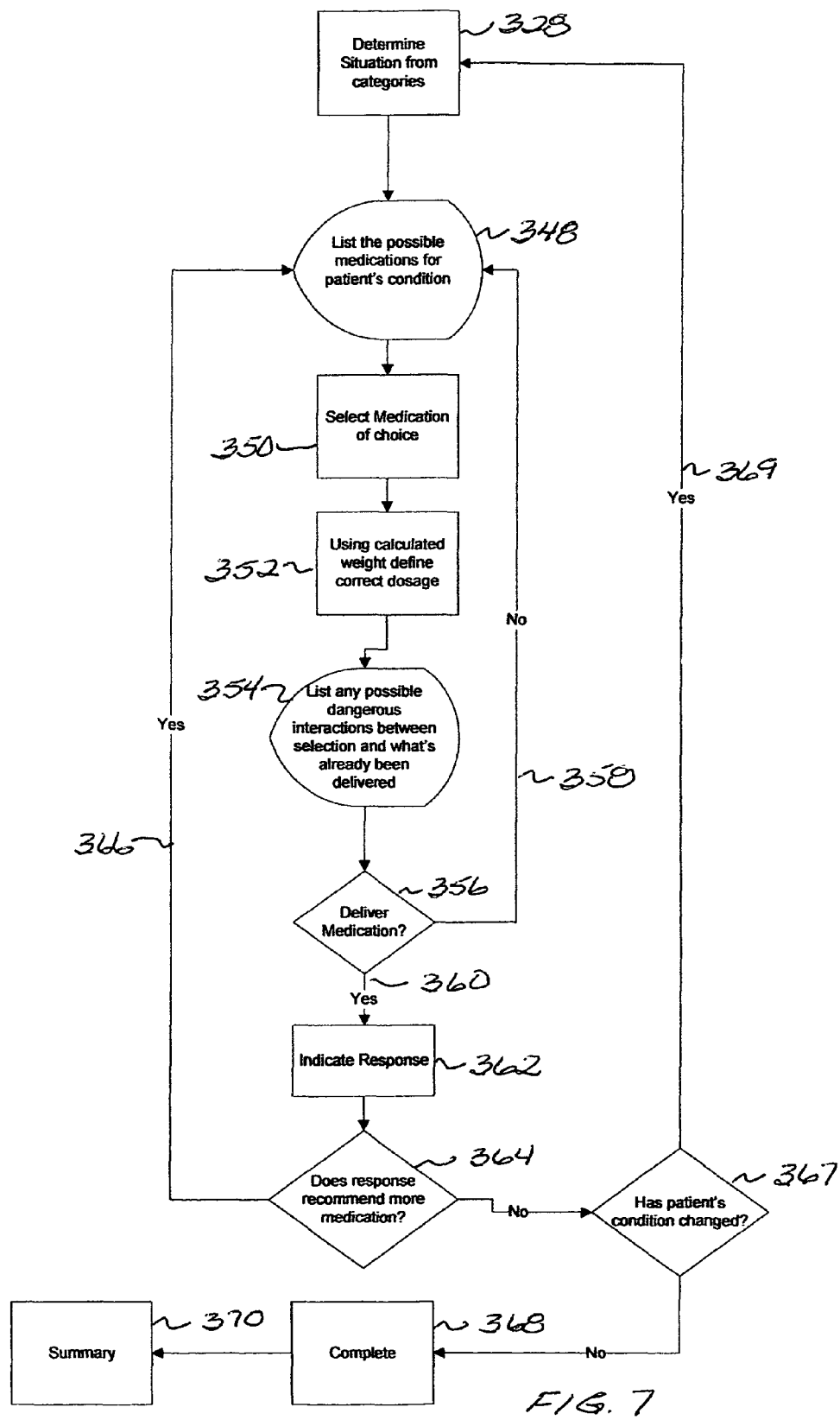
FIG. 7 is a flow chart illustrating the general concepts that comprise the emergency patient treatment portion of the present invention.

FIG. 7 is a simplistic flow chart to demonstrate the path of this embodiment of the present invention through its most direct route. As is shown below, when actual patients with specific emergency health issues are being addressed, the flow chart expands from that of FIG. 7 to provide for those specific issues. Here, the selection event 328 in the flow chart of FIG. 6 is followed by the step 348 of the presentation of possible medications for use in treating the patient's condition. Then, at step 350, the emergency physician selects one or more medications from the list which is presented in step 348. Then, using the patient's weight previously calculated at 328, the system 10 defines the correct dosage of the selected medication to be administered to the patient at 352.

The system 10 then checks, at 354, to determine if there are any dangerous interactions that may occur as a result of the administration of that medication to the patient vis-a-vis any other medications that have been administered previously. In view of the result of the check 354, the emergency physician, at 356, decides whether to administer the selected medication. If the decision is "No," a feedback loop 358 is provided to return the physician to the list of medications 348 so that an alternative selection can be made. Conversely, if the decision is positive for administration of the medication, at 360, the emergency physician then notes the response of the patient to the delivered medication at 362 and determines if additional medication is needed at step 364. If so, another feedback path 366 exists to return the display to that provided at step 348 and the process again occurs until a decision is reached at step 364 that no additional medication needs to be administered.

FIG. 7 also indicates another feature of the present invention. That is, the ability to respond quickly and accurately to a change in the patient's condition during treatment. This feature is shown graphically by the provision of another decision block 367 where the inquiry is made as to whether the patient's condition has changed. By this inquiry, the system 10 is not asking whether the patient's condition has improved as the result of treatment to date, but rather whether the type of condition with which the patient is being confronted is changed. While other examples are clearly possible, the more prevalent changes are those where the patient goes either into shock or cardiac arrest while being treated for some other condition. The timing of this change in condition obviously can occur at any time during the treatment protocol and is only shown in exemplary fashion in FIG. 7 as occurring subsequent to the administration of medication at 356. If the patient's condition has changed, the feedback loop 369 takes the emergency physician back to box 328 where the physician can then select a different condition for treatment. If the patient's condition has not changed, the process provided by the system 10 is then completed at step 368.

There are two additional features of the system 10 that have not yet been described. First, as can easily be accomplished in a system of this type, the internal clock in the computer 18 is utilized to time-stamp every event that occurs during the operation of the system 10. This feature allows the system 10 to not only warn the emergency physician of dangerous interactions with other medications at step 354, but also to warn that an additional administration of the medication of choice is possibly not appropriate at that time. Secondly, the use of a time-stamp permits the system 10 generate a time specific summary of all events that have taken place during the treatment of the patient. The availability of this summary is indicated at step 370 in FIG. 7. While this event is depicted in FIG. 7 as occurring at the conclusion of the patient's treatment, which is a time at which such a summary will almost always be needed, it is a feature of the system 10 that this function can be accessed at virtually any time during the treatment continuum. The summary may printed out or may be viewed on the monitor 26 or elsewhere, such as when a consultant is engaged in the treatment. It may also be transmitted electronically to a patient's records section 56 of the database module 42 for permanent retention.

Although not specifically shown in any of the drawing figures, it is a feature of the present invention that the attending emergency physician is able to insert into the system 10 a running description of the non-medication events that occur during the treatment of the patient. When so entered, the time-stamp is applied to these entries as with the events falling specifically within the screens and flow charts that are being described. In this manner, when a summary of patient treatment is retrieved, as at step 370, not only are the medication delivery events listed along with the time at which the deliveries took place, but also all other treatments administered to the patient are included. Then, as noted above, this summary record travels with the patient via the barcode on the patient identification bracelet throughout the patient's stay in the hospital.

The remainder of the description of the present invention will be provided by the presentation of three examples of how the system 10 is utilized during the treatment of three different exemplary patients. As will be readily seen from these descriptions and the accompanying drawing figures, one of ordinary skill in the art will be able to readily utilize what is presented to provide similar flowcharts and graphic screens for use by emergency personnel for any of a wide variety of emergency conditions that may be seen in the emergency medicine theater where the system 10 is used.

EXAMPLE 1B

The patient in this example is the same patient that has been discussed in the earlier EXAMPLE 1A, i.e., an obese middle aged male who has been found unresponsive and in cardiac arrest after shoveling snow. His weight has now been determined through the use of system 10 to be 172.3 Kg. Inasmuch as the patient is in cardiac arrest, the "ACLS/PALS" button in the screen of FIG. 5 is selected. Now, the particular drug treatment protocol for this patient will be discussed using the series of screens that are shown in FIGS. 8A through 8H and the associated flow chart of FIG. 9.

Figure 8A:
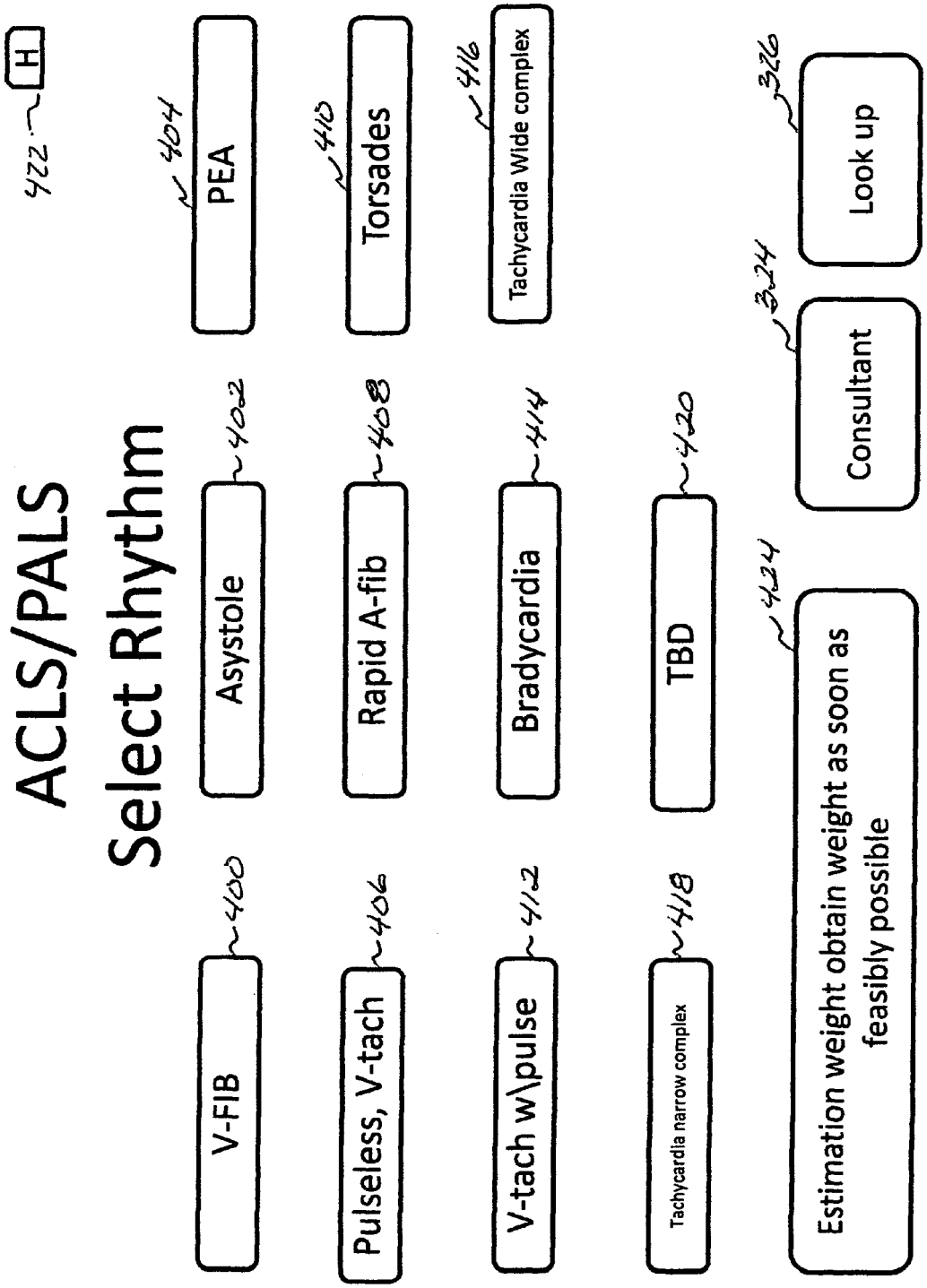

The first screen that the system 10 presents to the emergency physician after the selection of the ACLS/PALS protocol is that of the "ACLS/PALS—Select Rhythm" screen shown in FIG. 8A, This screen lists, inter alia, the various electrical rhythms in which the patient's heart is most likely to be when initially examined and a button on the screen is associated with each of them. These rhythms and their associated buttons are "V-FIB" (ventricular fibrillation) 400, "Asystole" 402, "PEA" (pulseless electrical activity) 404, "Pulseless, V-tach" (ventricular tachycardia) 406, "Rapid A-fib" (atrial fibrillation) 408, "Torsades" 410, "V-tach w/pulse" (ventricular tachycardia with a pulse) 412, "Bradycardia" 414, "Tachycardia Wide Complex" 416, and "Tachycardia Narrow Complex" 418. Also shown on this screen is a "TBD" button 420 which permits the emergency physician to enter another, less common electrical condition of the patient's heart should that be the case. Further, a "Home" button 422 is provided which allows the physician to access the "Home Screen Select Category" screen of FIG. 5 in the event that the patient's type of condition changes as has been discussed previously with respect to FIG. 7. Finally, in the bottom row of buttons is one, 424, which serves to remind the emergency personnel that the patient weight with which they are working is only a approximation and that the patient's actual weight should be determined at the earliest feasible time. Once again, the "Consultant" and "Look up" buttons, 324 and 326, respectively, continue to be included. In the this exemplary case, since the patient is in cardiac arrest and no heart electrical activity has as yet been detected, the "Asystole" button 402 is selected and touched.

Figure 9:
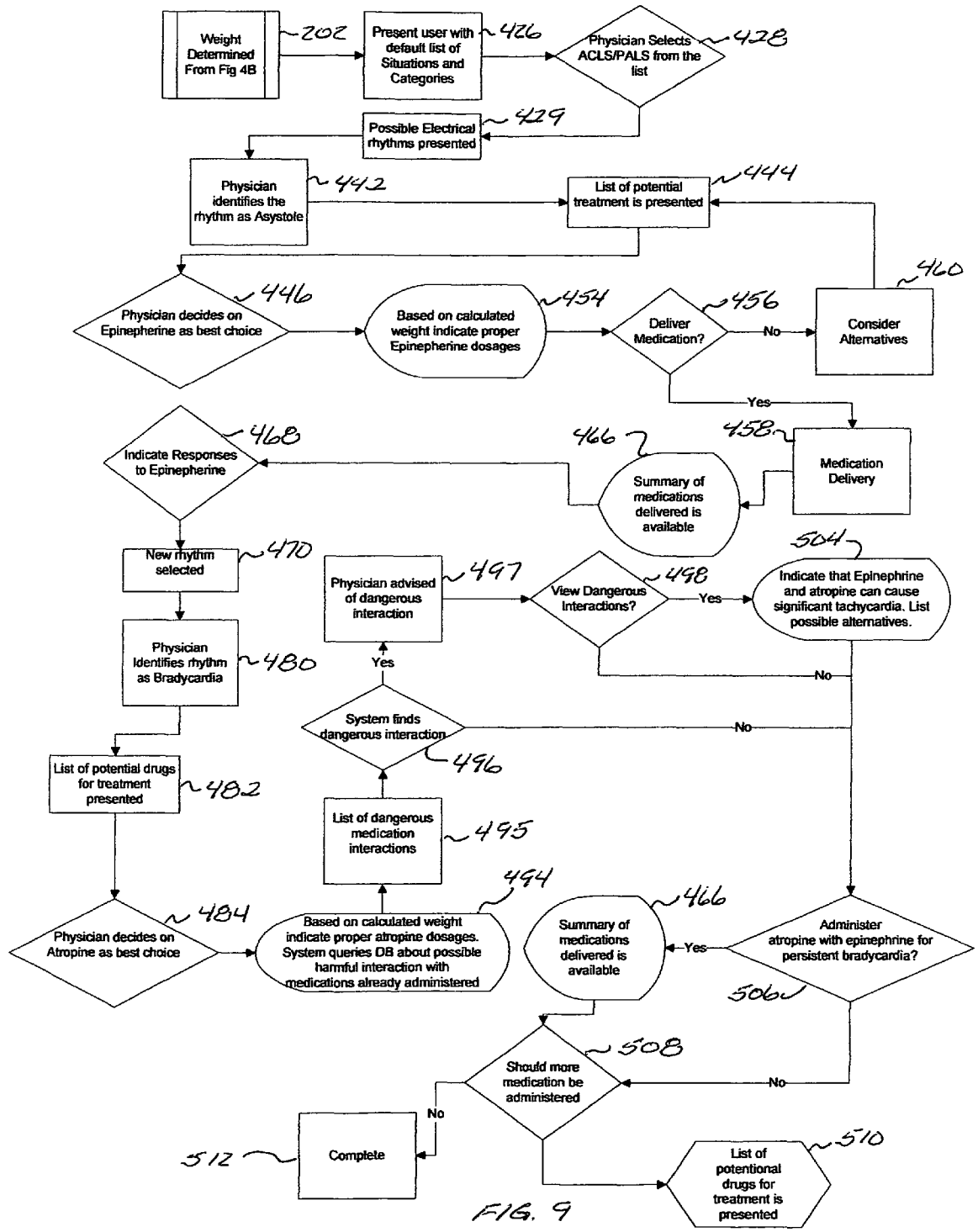
FIG. 9 is a flow chart that corresponds to the series of events that are depicted in the screens shown in FIGS. 8A through 8H.

Turning for the moment to FIG. 9, this action is shown by the box 202 which represents the result of the weight determination process described above with respect to FIGS. 3 and 4. Hence, the presentation of the screen of FIG. 5 is indicated at 426 and the subsequent selection of the ACLS/PALS category is indicated at 428. Then, at 429, the list of possible heart electrical rhythms shown in FIG. 8A is presented.

Figure 8B:
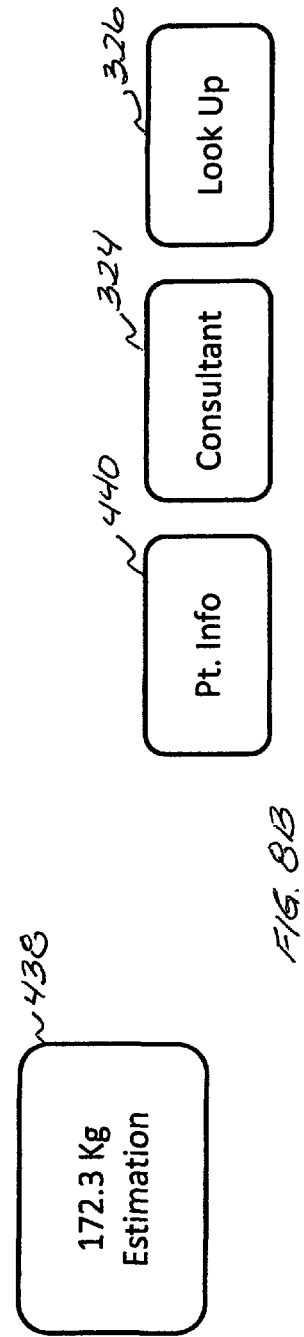

When the Asystole button 402 is touched, the "ACLS/PALS ASYSTOLE/MEDICATIONS" screen shown in FIG. 8B is presented on the monitor 26. Four alternatives are presented, each of which has an associated "Select" button. Those are "Epinepherine," button 430, "Atropine," button 432, "Vasopressin," button 434, and "Overdrive Pacing," button 436. Of course, the list of potentially useful medications shown in FIG. 8B is merely exemplary and is not intended to be exhaustive. Other such medications may well exist today and others certainly will be developed in the future and are intended to be included within the scope of the invention.

Additionally, a window 438 is presented on the screen of FIG. 8B which indicates once again that the patient's calculated weight of 172.3 Kg is only an estimation to continue to remind the emergency personnel that, as soon as feasible, a more accurate actual weight should be determined. A "Pt. Info" (patient information) button 440 is provided on this screen to permit access to the patient's electronic medical records, if any exist, such as in the patient medical records files 56 in the database module 42. Finally, the "Consultant" and "Look up" buttons 324 and 326, respectively, continue to be present. In the present example, the treating emergency physician selects epinepherine as the chosen medication with which to attempt to treat the patient under cardiac arrest by touching the "Select" button 432.

In FIG. 9, the event shown by the screen of FIG. 8B is depicted by the heart rhythm being identified as asystole at 442 which results in the list of potential treatment medications being listed on the monitor 26 at 444. Then, the emergency physician's decision to administer epinepherine to the patient in cardiac arrest is noted at 446.

Once the selection of epinepherine is made on the screen of FIG. 8B, the "ACLS/PALS ASYSTOLE" screen shown in FIG. 8C appears. Here, the screen shows that the appropriate rate of administration of epinepherine is 0.01 mg/kg and, based on the calculated weight of 172.3 kg, the system 10 suggests that 1 mg of epinepherine by administered to the patient at button 448. Here the system 10 of the present invention recognizes that, for this particular medication, a maximum safe dosage of this medication exists independently of patient weight and, therefore, suggests the maximum dosage of one milligram for this severely overweight patient. An inexperienced, tired or otherwise distracted emergency health provider could erroneously calculate the dosage for this patient based solely upon his weight and, consequently administer more than the recommended maximum dose. The resuscitation station system 10 thus creates a level of safety in these stressful situations. The screen of FIG. 8C further notes that no interactions or allergies have been noted as a result of the data input to the system 10 to date. The screen of FIG. 8C also prompts the emergency physician to consider using external pacing at button 450 and the administration of atropine at button 452. Finally, the screen of FIG. 8C includes the previously described button noting the patient's estimated weight 438, the "Patient Info" button 440, the "Consultant" button 324 and the "Look up" button 326. Inasmuch as the emergency physician has selected to administer epinepherine, button 448 is activated to cause the delivery of the appropriate dose of epinepherine to the patient.

Turning, once again, to the flow chart of FIG. 9, after the selection of epinepherine as the medication of choice at 446, the system 10 calculates the proper dosage of epinepherine based on the previously determined weight of the patient and the maximum safe dosage of epinepherine at 454. Then, the emergency physician makes the decision to administer epinepherine or to consider an alternative treatment at 456. If a decision is made at 456 to deliver that dosage of the medication, that delivery occurs at 458. If a decision is made at 456 to consider alternatives, those are listed at 460 and a selection of an alternative results in a return to the listing of potential drugs for treatment at 444. In this example, however, since the decision is made to administer the epinepherine to the patient, this path is not followed.

The "ACLS/PALS ASYSTOLE" screen shown in FIG. 8D now appears on the monitor 26. On it, it is indicted that the suggested dosage of epinepherine has been delivered and requests that the patient's response to it be entered into the system 10. In this instance, only two responses categories are provided, "None," in which case, the asystole treatment should be continued, as indicated by the button 462, and if a "New Rhythm" has occurred, as indicated by the button 464. Inasmuch as a medication has now been delivered, a new button 466, "Summary," is provided which affords the emergency physician the ability to request a summary of the medications and other treatments provided to the patient to date. Also included on this screen are the previously discussed buttons 324, 326, 438, and 422 for "Consultant," "Look Up," weight estimation, and "Home Screen," respectively. In this example, a slow pulse has now been detected; hence, the "New Rhythm" button 464 is touched. In FIG. 9, this action is shown at 466 as a summary of medications delivered being available, at 468, where the emergency physician indicates the response to the epinepherine, and 470 where the emergency physician indicates that a new rhythm is present.

When a new rhythm is indicated by touching the button 464 in FIG. 8D, the monitor display returns to that of FIG. 8A where, because of the new response that has been found, the emergency physician touches button 414 to indicate that the "Bradycardia" rhythm is now present rather than the former asystole rhythm. This causes the screen of FIG. 8E to appear. This screen is similar to that of FIG. 8B, except that the medications listed here are those that are appropriate for treating the bradycardia condition. Here, the suggested medications and/or treatments to be administered are "Epinepherine," "Atropine," "Dobutamine" and "Pacing." These suggestions are paired with the associated "Select" buttons 472, 474, 476 and 478, respectively. In addition, the "Home," weight estimation, "Summary," "Consultant" and "Look up" buttons and windows, 422, 438, 466, 324 and 326, respectively, are located on this screen and have the functions as described above In this example, the emergency physician selects atropine as the medication to be administered to the patient and touches button 474. In FIG. 9, this is depicted at event 480, where the emergency physician indicates that the new rhythm is that of bradycardia, whereupon the list of potential medications and treatments for use in dealing with that condition is displayed at step 482 and the selection of atropine is shown being made at step 484.

The selection of atropine causes the "ACLS/PALS BRADYCARDIA" screen of FIG. 8F to appear. This screen is somewhat similar to that of FIG. 8C with respect to the selection of epinepherine for the prior asystole condition. The proper dosage for atropine for the treatment of bradycardia is shown to be 0.02 mg/kg of patient weight, which weight has been calculated previously as 172.3 kg as noted at 438. However, here again, atropine, like epinepherine, has a suggested maximum safe dosage of 1.0 mg; hence, in FIG. 8F, the button 486 indicates only 1 mg per IV push is to be administered.

However, the window 488 indicates that the system 10 has determined that a potentially dangerous interaction between the selected medications exists with the selection of atropine as the medication of choice for treatment of the bradycardia. This screen also includes a warning that atropine is not indicated appropriate for a third degree heart block. Further, the window 488 indicates that, by touching or clicking on that button, the emergency physician may get information as to the nature of the noted dangerous interaction. Also shown in the screen of FIG. 8F, like FIG. 8C, is the button 486 which, when activated by touch, will commence delivery of the atropine to the patient via an IV. Additionally, this screen includes a button 490 to suggest to the emergency physician that application of heart pacing equipment should be considered at this point in the treatment. Also, button 492 suggests to the emergency physician that dobutamine be considered as an alternative to the atropine. Finally, the "Home" button 422, the patient weight estimation button 438, the "Summary" button 466, the "Consultant" button 324, and the "Look up" button 326 are included in this screen and have the identical functions as have been described previously.

Turning once again to the flow chart of FIG. 9, it is seen that the system 10, using the previously calculated patient weight, determines, at step 494, what a proper dosage of atropine is to be. Also, at step 494, the system 10 queries the database module 42, and specifically the table of emergency conditions 58, to see if the use of atropine following the prior administration of epinepherine could result in any dangerous interactions for the patient. This event is depicted at step 495. When the system 10 detects at step 496 that such a dangerous interaction does exist, it notifies the emergency physician at step 497 of this potential problem and asks, at step 498, whether the physician wishes to see what that dangerous interaction is.

In the present example, the emergency physician elects to see what dangerous interaction the system 10 has detected and actuates the button 488 in FIG. 8F, thereby causing the "DANGEROUS INTERACTION" screen of FIG. 8G to appear on the monitor 26. As can be seen, the system 10 indicates that the combination of epinepherine and atropine can cause significant tachycardia, i.e., a heart rate that is significantly faster than a normal heart rate of 60 to 100 beats per minute. The system 10 also notes on this screen that, for persistent bradycardia, the use of atropine with epinepherine should be considered. Hence, in the present example, the emergency physician is alerted to the fact that, although the prescribed combination of medications can cause tachycardia, it is the treatment of choice for the patient's present condition. The screen of FIG. 8G also suggests again that "Pacing" should be considered as an alternative and provides a button 490 for that treatment. A further button 500 allows the physician to access other recommendations for treatment. More importantly, an "ACKNOWLEDGE AND DELIVER MEDICATION" button 502 is provided for activating the deliver of the atropine to the patient. Finally, as before, the "Home," "Summary," "Consultant" and "Look up" buttons, 422, 466, 324 and 326, respectively are included in this screen.

Although not central to the present embodiment of the invention, it is preferred that some means be provided within the system 10 to immediately alert the emergency personnel to the presence of an important situation in the treatment protocol. This could be an audible tone or any other attention acquiring phenomenon. However, the presently preferred means is to utilize a bright color, preferably red, on at least some portion of the screen being presented on the monitor 26. Hence, for example, the entire background of the screens shown in FIGS. 8F and 8G could presented in red to alert the emergency personnel to the potentially dangerous situation that could be caused by the interaction of epinepherine and atropine. Also, the background of a single button or window in a screen could be presented in such a bright color to attract attention. Exemplary of such a coloration might be the red coloration of the button 438 in several of the drawing figures alerting the emergency personnel that the weight being used for the patient is only a calculated one which should be replaced by an actual weight for the patient as soon as practicable.

In this example, because the emergency physician is fully aware of the potential adverse result and on the lookout for it, the emergency physician activates the "ACKNOWLEDGE AND DELIVER MEDICATION" button 502 to deliver the atropine to the patient, which treatment is successful, the tachycardia having not occurred and a normal heart rhythm having been established. In the flow chart of FIG. 9, the events associated with the screen in FIG. 8G are depicted. At step 504, the system 10 indicates to the emergency physician that epinepherine and atropine can cause significant tachycardia and lists possible alternatives. At step 506, the physician decides whether to administer the atropine to address the bradycardia. If that decision is positive, a summary of medications delivered is then available at step 466. However, in either case, i.e., whether the decision is positive or negative, the flow chart then proceeds to step 508 where the emergency physician decides whether a need exists to administer additional medication. If the decision is positive, either because the existing condition is not sufficiently altered or because some different rhythm is established, such as might be the case if the tachycardia problem noted by the system 10 occurred following the administration of the atropine, the system 10 proceeds, at step 510, to the list of possible heart rhythms that is presented in FIG. 8A and the process continues appropriately where appropriate medication or other treatment may be selected. If "no," the use of system 10 for this patient in the emergency department is complete as shown at step 512. However, as noted previously, because all of the information concerning this patient that has been entered into the system 10 during treatment of the patient in the emergency department is now a part of the records of the hospital, whenever the patient's wrist bracelet or other identification indicia is scanned during the patient's remaining stay in the hospital, all of the information entered in the emergency department will be immediately available.

Finally, with respect to this example, the "Medication Summary ACLS/Bradycardia" screen of FIG. 8H is presented. This screen is a summary of the medications and other treatment and events that would be presented to the attending emergency physician when the "Summary" button 466 is activated in FIG. 8F and is available at step 466 in FIG. 9. Obviously, a "Summary" screen that is requested at some other time during the use of system 10 in this example would result in showing just those events that had occurred prior to the time of the request for the summary. As can be seen, there are three general areas of information in the summary of FIG. 8H; the "Delivered" medications and other treatment and events on the left, the "Recommended" medications and treatment on the right, and the "Time" that the summary is requested at the top right. More specifically, it is seen at window 514 that this exemplary summary is requested at 1259. The column for delivered medications is headed by the "Delivered" window 516. Below that is a series of windows that successively set forth the medications that have been delivered to the patient, i.e., window 518 shows the initial delivery of dose 1 of epinepherine at 1253, window 520 shows the delivery of dose 1 of the atropine at 1256, and window 522 indicates that a second dose of epinepherine was given at 1258. Under the "Recommended" window 524, are two exemplary windows indicating further actions that might be taken by the emergency physician in the treatment of the patient, i.e., window 526 notes a second dose of atropine being due at 1301 and window 528 suggests the potential of using overdrive pacing. Of course, it should be understood that the two options shown in FIG. 8H are merely exemplary. This screen could, within the scope of the invention, either include a wider array of additional medications and/or other options that might be utilized. Additionally, the "Summary" could have an additional "Other Options" button on it which, when used, would have an additional "Other Options" button on it which, when used, would take the emergency physician to one or more additional screens where all such additional options would be displayed. It should be further understood that the list of such options will expand or contract as the science of medicine advances over the years to come. The screen of FIG. 8H also includes a button 530 which permits the emergency personnel to either print a copy of the this summary or to send it to some other destination, such as, for example, a consultant or the patient medical records 56 in the database module 42. Finally, the screen of FIG. 8H again includes the ubiquitous "Home," "Consultant," and "Look up" buttons, 422, 324, and 326, respectively.

The continual availability of the "Summary" of medications and other treatments is an important, although not essential, feature of the present invention. The most obvious benefit of the "Summary" screen is to enable the treating physician to constantly have a means of recalling precisely what medications and other treatment has been administered to the patient and when that occurred. Also, presently, the treating emergency physician has to write or dictate, after the fact, a summary of the events that occur with respect to a patient's treatment to be included in the patient's records. Often, this can occur well after the time that the treatment took place and errors in creating that record can easily occur, particularly with respect to the time of the events. Here, because that record is available electronically in the system 10 and is time-stamped, the treating physician can simply direct that a copy of the summary be transferred electronically to the patient's records, which entry will be error free. Also, through the use of voice recognition software in conjunction with the system 10, the emergency physician's treatment notes can be dictated and thereby entered into the patient's treatment record contemporaneously with the treatment thereby ensuring a more complete and accurate record. Further, in the event that the emergency physician decides to contact a consultant or a different physician takes over care of the patient, that summary is then available immediately to permit the consultant or other physician to know precisely what has transpired to date and when each such event occurred.

EXAMPLE 2

As a second example of how the system 10 of the present invention can advantageously be used to determine the weight of a patient in an emergency situation, an approximately nine months old child is brought to a hospital's emergency department after being rescued from a house fire in which all known relatives of the baby have perished. As such, no additional information about the child is known. The child is not clothed due to the fire and no associated equipment is located on the stretcher. This example of the use of the system 10 is made with reference to FIGS. 10 and 11, FIG. 10 being a series of screens that appear on the monitor 26 during the treatment of this patient with the introductory screens shown in FIGS. 3A through 3C being omitted as the child's weight is not known upon entering the emergency department. FIG. 11 is an associated flow chart. Inasmuch as some portions of the description of this example of the use of the system 10 are identical to those described with respect to Example 1, in the sake of brevity, the description of those portions are not repeated here in detail. Once again, like reference numerals will refer to identical elements of the system 10.

Figure 10C:
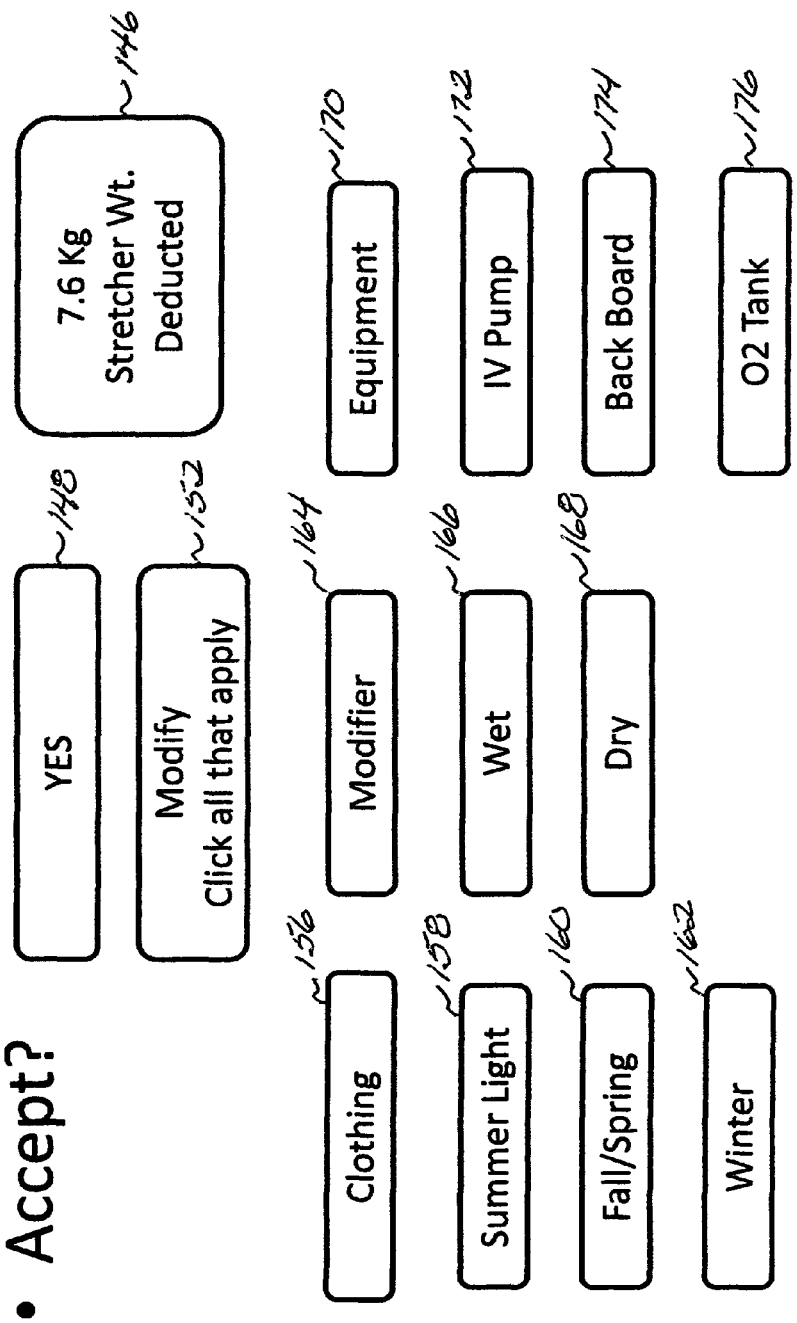
Figure 11:
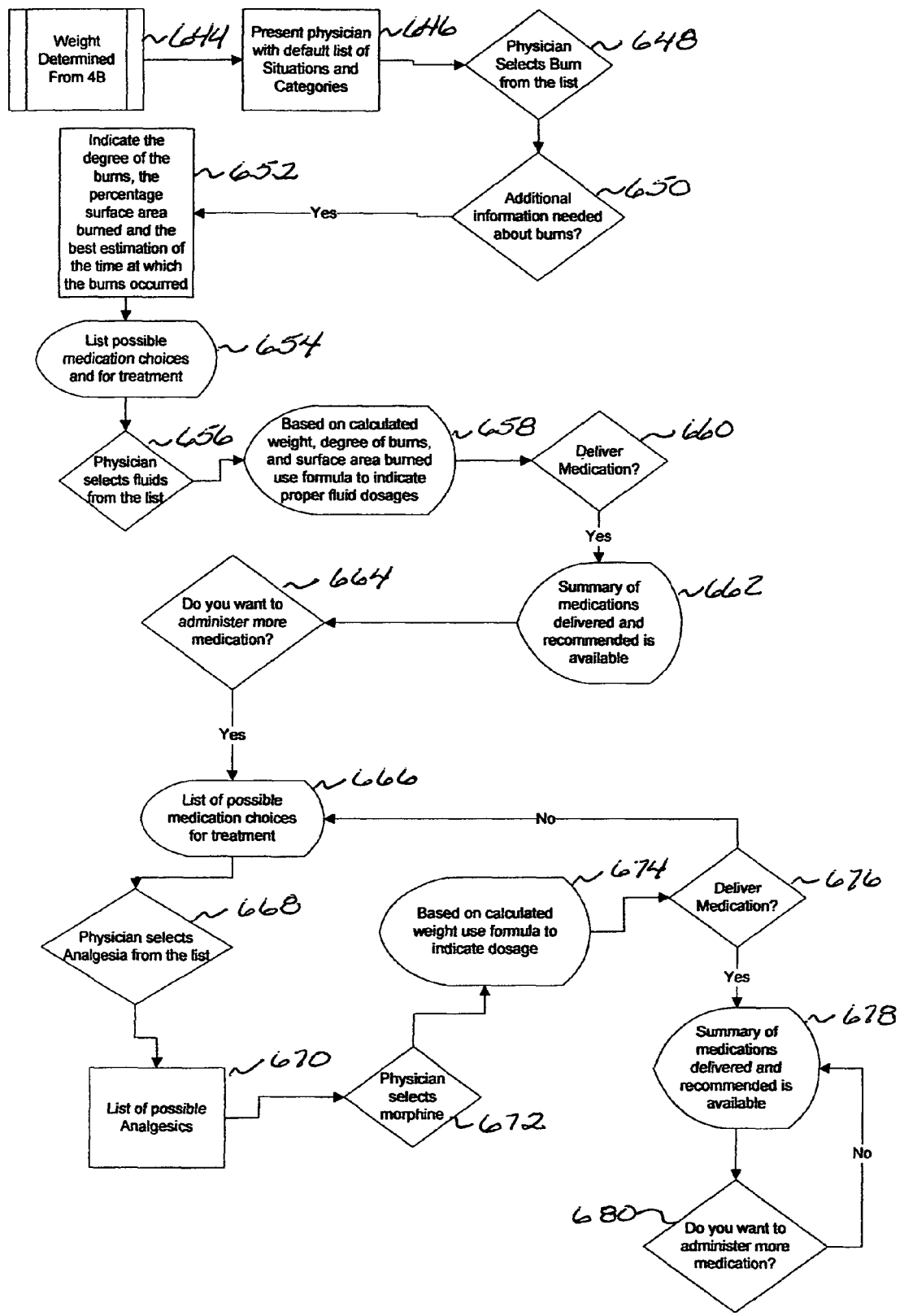
FIG. 11 is a flow chart that corresponds to the series of events that are depicted in the screens shown in FIGS. 10A through 10K.

The screen shown in FIG. 10A is virtually identical to that of FIG. 3D; however, the gross measured weight of the patient plus the stretcher that is shown in window 122 is now only 107.6 kg. In FIG. 10B, which also is like FIG. 3E, appears after the "Modify" button 138 is actuated in the screen of FIG. 10A, the stretcher identification number, S127, is entered into window 126. When either the "Accept" or "Modify" buttons 136 and 138, respectively, are touched, the "Calculated Patients Weight" screen of FIG. 10C appears, which screen is like that shown in FIG. 3F. The window 146 indicates that the child weighs 7.6 kg as the weight of the stretcher, 100 kg, has now been subtracted. Since there is no clothing or equipment involved in the gross weight that was measured, no further modifications to the gross weight are needed and the "Yes" button 148 is actuated leading to the final "Calculated Patients Weight" screen of FIG. 10D, which is similar to that of the screen of FIG. 3G. Here, it is noted in windows 600, 602, and 604 that no modifiers have been entered and window 184 confirms that zero kg have been subtracted for modifiers, leaving an "Accurate" weight for the child at 7.6 kg in window 186. This "Accurate" label is caused by the fact that only the gross weight and known tare weight of the stretcher are involved in the calculation with no estimations having been made in order to arrive at the child's actual weight.

When the "Accept" button 188 is actuated, the "Select Category" screen of FIG. 5 appears. Since the child in this example is suffering from severe burns, the "Burns" button 306 is touched which causes the "Burns" screen of FIG. 10E to appear on the monitor 26. This screen first requests the emergency physician to estimate and enter the percentage of the patient's body that has been subjected to third degree burns at window 606. Most frequently at the present time, this estimation is made using the so-called Rule of 9's formula. According to this formula, for adults, the percentage of surface area on the body is divided into 9% for each arm, 18% for each leg, 9% for the head, 18% for the front torso, 18% for the rear torso, and 1% for the genitalia. In children, the percentages are: 9% for each arm, 14% for each leg, 18% for the head, 18% for the front torso, and 18% for the rear torso. Then, the fluid requirements for treating the victim are determined by the so-called Parkland formula which is: TBSA (total body surface area) burned (%)×patient weight (kg)×4 milliliters plus maintenance fluids, with half of the fluid being given to the victim over the first 8 hours after the burn occurs and the second half over the succeeding 16 hours. Using this formula, the emergency physician can rapidly and fairly accurately assess the percentage of body area which has suffered third degree burns. In this example, the estimate is that 40 percent of the child's body has suffered third degree burns and this amount is entered by actuating the button 606 and then entering the percentage burned using either the keyboard 46 or vocally through the voice recognition unit 47.

The screen of FIG. 10E also has a window 605 through which the emergency physician enters the best estimate of the time at which the child suffered the injury. Again, the entry of this data is accomplished through the keyboard 46 or the voice recognition unit 47 This is necessary because the fluids requirement discussed above is dependent upon its being furnished according to the time at which the burns occurred. In other word, the initial eight hour period for supplying the first half of the fluids and all subsequent times are calculated from the time of the injury, not the time of commencement of treatment. Finally, the screen of FIG. 10E shows the window 608 with the child's true weight and a "Next" button 607 which is actuated in order to advance to the succeeding slide, FIG. 10F. Also included on this screen are the buttons 324, 466 and 236 for the "Consultant," "Summary" and "Look up" functions.

After the patient's percentage of burned area and the time of injury have been entered in the screen of FIG. 10E, the "Burns" screen of FIG. 10F appears. This screen shows the amount of burned area, 40 percent, in window 606, the patient's true weight at 608, and the time of injury, 1130 in the window 609 to serve as a reminder of the time during which the fluids need to be administered and to set the time stamp in the system 10 so that it can provide appropriate reminders to the emergency personnel for administering those fluids. The screen then presents three buttons for treatment options, "Fluids" at 610, "Analgesia" at 612, and "Airway" at 614, from which the treating emergency physician may select. Finally, the "Summary," "Consultant" and "Look up" buttons 466, 324 and 326, respectively, continue to be provided in this screen. In this example, since the administration of fluids to a severely burned patient is critical to prevent the patient from going into shock, the initial treatment is to select the "Fluids" button 610.

When the "Fluids" button 610 is actuated in the screen of FIG. 10F, the "Burns/Fluids" screen of FIG. 10G appears and provides the emergency physician with the calculation of fluids needed for the child patient under the Parkland formula, i.e, 1216 milliliters (cubic centimeters) plus maintenance fluids which the system 10 can calculate and add to the amount shown. As noted in the screen, the fluid to be administered to the child is a normal saline solution. The screen notes that the first half of this volume should be administered over the first eight hours, calculated from the time at which the burn injury occurred. This time is shown in the window 609. A window 616 is provided to show the running time that passed since the injury. At this point, a "Next" button 618 is provided for allowing the treating emergency physician to advance the system 10 to the succeeding screen, FIG. 10H.

In the screen of FIG. 10H, "Burns/Fluids," a button 621 is provided for enabling the emergency physician or other personnel to begin the infusion of the fluids to the child patient. Once the administration of fluids has begun, the physician must then deal with the other important aspect of burn treatment, the pain associated with the injury and with any other injury that the patient may have suffered. To this end, the final new button on the screens of FIGS. 10G and 10H is the "Return to Burns" button 620. The actuation of the "Return to Burns" button 620 serves to return the display on the monitor 26 to the "Burns" screen of FIG. 10F where the administration of an analgesic or an airway treatment are presented as options by buttons 612 and 614, respectively. On the other hand, if the patient is suffering from a severe injury, such as crushed chest, the "Home" button 422 would be actuated to allow the physician to return to the main menu that is shown in FIG. 5 where the trauma button 312 could then be selected. Once again, the "Consultant," "Look up," and "Summary" buttons 324, 326 and 466 continue to also be provided.

In the case of this example, however, since the child does not appear to have any additional serious injuries, the "Return to Burns" button 620 is actuated and the "Burns" screen of FIG. 10F returns to the monitor 26. Here, the physician now has the option of either treating the patient's pain by prescribing an analgesic by selecting button 612 or, if it is found that the patient is having trouble breathing, the airway button 614 would be selected. This is not the case with the child of this example. Hence, the "Analgesia" button 612 is chosen and the "Burns/Analgesia" screen of FIG. 10I is presented.

The screen shown in FIG. 10I is similar to those in FIGS. 8B and 8E. Here, two medications, morphine and fentanyl are listed together with associated buttons 622 and 624, respectively, by which the emergency physician can select one for use in the treatment of the patient for pain. Also present on this screen are the previously described buttons for the patient's weight 608, "Home" 422, "Summary" 466, "Consultant" 324 and "Look up" 326. For this patient, the emergency physician selects the most common choice, morphine, by selecting button 622, which brings the screen of FIG. 10J onto the monitor 26.

In the "Burns/Analgesia" screen of FIG. 10J, the selected analgesic, morphine, is shown by the system 10 to be administered appropriately at a dosage of 0.1 mg/kg of patient weight. Button 626, therefore, shows the delivery of morphine to the child at that dosage as determined by the system 10. When the button 626 is actuated, the delivery of the morphine to the child is commenced. The screen of FIG. 10J also includes buttons 610 and 612 which provide the emergency physician with a shortcut means of reaching the primary screens for fluids and airway, respectively. Finally, this screen contains six additional features that have been described with respect to previous screens, namely, the "Home," "Summary," "Consultant," and "Look up" buttons, 422, 466, 324 and 326, respectively, and the "Patient weight" and "Time of burn" windows, 608 and 616, respectively.

The last screen that appears in this example is that of FIG. 10K, which is a "Medication Summary Burns" screen which can be accessed by actuating the button 466 in FIG. 10J. Similar to the "Summary" screen, FIG. 8H, with respect to Example 1, this screen presents the relevant information in two columns headed by windows entitled "Delivered" and "Recommended," 628 and 630, respectively. Below the "Delivered" heading are two windows, 632 and 634, that indicate the amount of fluids delivered to date to the child patient, 178 cubic centimeters of natural saline solution, and the quantity of morphine administered, 0.76 milligrams, and the time at which the administration of that morphine occurred, 1147, respectively. In the "Recommended" column two buttons, 636 and 638, are provided. Button 636 suggests to the emergency physician that steps may need to be taken to provide a clear airway for the patient, while button 638 reminds the physician that, in a case of severe burns such as present in this example, escharotomy may be needed to relieve pressure at the burn sites. Once again, this "Summary" screen includes a window 640 setting forth the time at which the summary is requested. Lastly, the "Home," "Consultant," and "Look up" buttons, 422, 324 and 326, respectively, are also included here. As on the screen of FIG. 8H, a "Print/Send Summary" button 530 is included.

Turning next to the flow chart of FIG. 11 which is associated with the series of screens in FIG. 10, it is shown that the patient's weight is determined at step 644, which determination derives from the results from FIG. 10D. After that determination, as is the case with the flow chart of Example 1 in FIG. 9, the emergency physician is then presented with the list of possible situations and categories on the "Home" screen of FIG. 5 at step 646 from which to select the one situation or category that is most appropriate for the condition of the patient. In this example, the emergency physician chooses "Burns" from that list at step 648. The system 10 then requests that the physician provide additional information about seriousness and extent of the patient's burns and the best estimation of the time at which the burns occurred at step 650. When the emergency physician enters data concerning the degree and extent of the patient's burns and the time of occurrence at step 652, the system 10 provides the physician with a list of possible medication and/or treatment choices at step 654. From this list, in order to commence supplying the needed fluids to the patient at the earliest possible time, the "Fluids" category of medication is selected at step 656.

Then, based on the previously calculated patient weight of 7.6 kg and the degree and extent of the patient's burns, forty percent third degree burns, the system 10 utilizes the Parkland formula to derive the appropriate amount of fluids to be administered to the patient at step 658. The physician then, at step 660, decides to administer the fluids to the patient. At this time, a summary of the medications delivered to the patient becomes available at step 662. The emergency physician is then queried, at step 664, as to whether any additional medication and/or treatment is required. When the response is positive, the physician is again provided with a list of potential treatment options at step 666. In this example, the administration of an analgesic is selected at step 668. The system 10 then presents to the emergency physician a list of possible analgesics at step 670, from which the physician chooses morphine at step 672. The system 10 then determines, based upon the patient's previously calculated weight, the appropriate dosage of morphine to administer at step 674. The emergency physician then decides whether to administer the selected morphine at step 676. If not, the system reverts to the list of possible medications and treatment at step 666 where a new course of action can be implemented. If the physician chooses to administer the morphine at step 676, the flow chart proceeds to make an updated summary of medications available at step 678 and the physician again decides if any additional medication is needed at step 680. Obviously, this sequence of events and treatment can, and generally would, continue for some time in a severe burn case such as in this example, but nothing would be served by drawing out this explanation of this aspect of the present invention further.

EXAMPLE 3

As a third example of the use of the present invention, a situation is presented where the system 10 is utilized in a military environment, such as field hospital. The patient is a 24 year-old victim of an IED (improvised explosive device) explosion. He has suffered bilateral lower extremity amputations above the knee. Appropriate tourniquets are in place. The victim is in full battle dress and is unconscious and in critical condition. Once again, in describing the operation of the system of the present invention in this example, where the function of a particular feature or element has been discussed previously, that description will not be repeated; however, the previous description is incorporated herein fully by reference. Also, like reference numerals are used to refer to identical elements of the system 10. In describing the drawings and events depicted in this example, the term "emergency personnel" will be utilized since it is often the case that in circumstances such as those here, a physician may not always be part of the team treating the patient and, almost certainly, no trauma surgeon will be part of the team. Hence, when a severely injured patient arrives at such an emergency basic medical hospital unit, the primary task of the emergency medical personnel manning the unit is to stabilize the patient and get the patient into the best possible condition for being transported, usually airlifted, to the nearest trauma center where the bulk of the medical treatment will be provided. Thus, this situation exemplifies the advantageous use of the "Consultant" feature of the present invention.

Figure 12C:
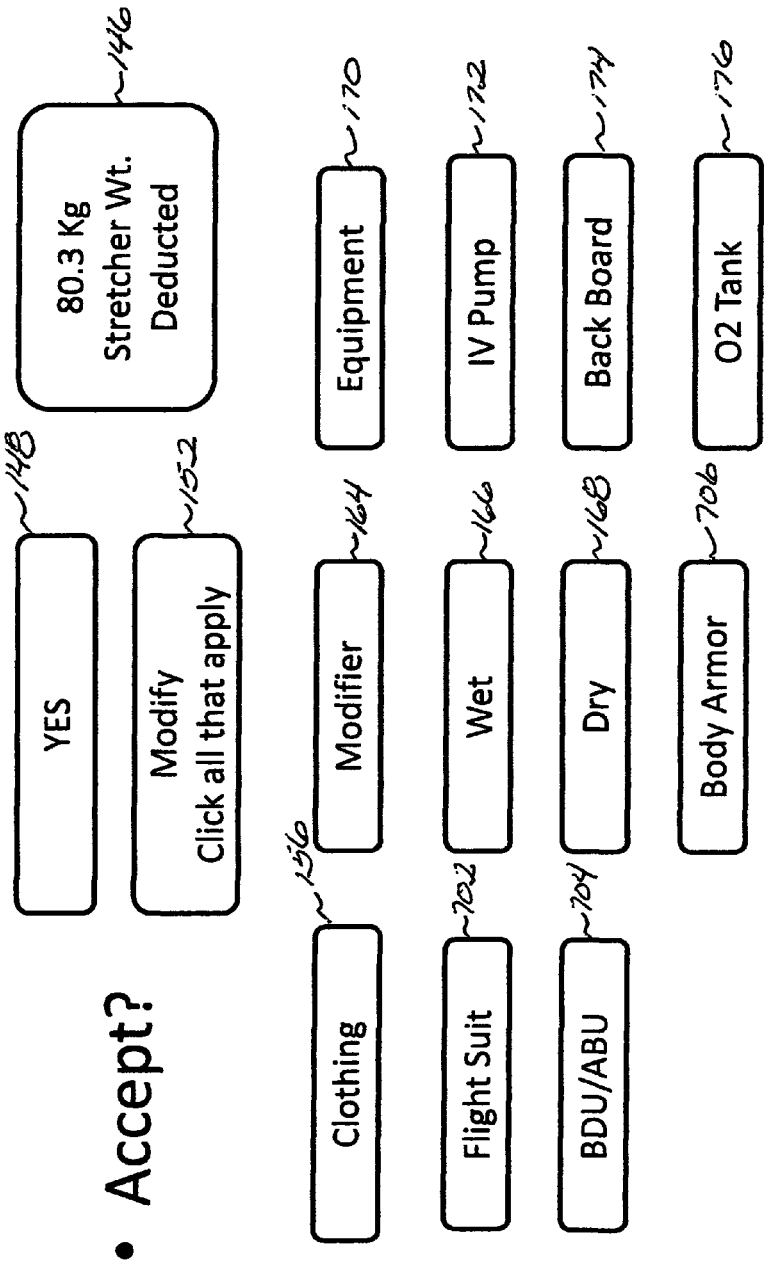

The first screen that appears on the monitor 26 is the "Measured Weight" screen that is shown in FIG. 12A. FIG. 12A is quite similar to the screen of FIG. 3B, except that the gross weight noted in window 122 is 160.3 kg. Also, in the screen shown in FIG. 12A, the window 700 expressly defines the environment as being in a "Military mode." This designation allows for the use of a differing set of conversion factors to be assigned to the various modification buttons that may be incorporated into the algorithm for calculating the estimation of the weight of the injured patient. For example only, the footwear worn by personnel in a battle situation are significantly heavier than those worn normally by civilians and this must be reflected in the weight estimations made by the system 10. Inasmuch as the victim is on a stretcher and wearing battle dress, the attending emergency medical personnel actuate the "Modify" button 138 and thereby acquire the screen of FIG. 12B. FIG. 12B is identical to the screen of FIG. 3E, except that once again for the gross weight, which is depicted at window 122, and the stretcher identification has been entered in the window 126 and the continued designation of the system as being in the "Military Mode" at window 700. Because of the soldier's battle dress, the "Modify" button 138 is actuated and the screen of FIG. 12C appears. While FIG. 12C is similar to FIGS. 3F and 10C, it differs in several respects and illustrates the fact that the system 10 can be adapted for use in a wide variety of environments and situations. Under the "Clothing" heading 148, the two buttons, 702 and 704, respectively, are labeled "Flight Suit," and "BDU/ABU" (Battle Dress Uniform/Airman's Battle Dress). It is noted in window 146 that 80 kg have been deducted from the gross weight to account for the stretcher which results in the soldier's gross weight with his battle dress being 80.3 kg. In this example, because of the victim being in battle dress with body armor in place, the "Modify" button 152 is actuated along with the "BDU/ADU" button 704, the "Dry" button 168, the "Back Board" button 174, and the "Body Armor" button 706. When the "Modify" button 152 is touched for a second time, the "Calculated Patients Weight Selection Review" screen of FIG. 12D appears.

The screen of FIG. 12D is again similar to those of FIGS. 3I and 10D; however, it continues to specify that this application of the present invention is in the "Military mode" in window 700. Based on the selections that were made on the screen of FIG. 12C, it is noted that an additional 20 kg are being subtracted from the gross weight to arrive at a calculated patient weight of 60.3 kg as noted in window 186. When the "Accept" button 188 is actuated, the "Calculated Patients Weight Manual Modify" screen that is FIG. 12E appears. However, in this example, the attending medical personnel have no need to make any additional modifications and the "Accept" button 196 is actuated to complete the patient weight determination phase of the soldier patient's treatment. Should the equipment be available to do so, the "Print patient label" button 192 is actuated to generate a bracelet or other indicia for the soldier. Inasmuch as it is highly likely that this patient will be transported to a higher level of military medical facility for further treatment, the acquisition of this indicia for the soldier will enable the medical personnel at that facility to access his records immediately and to better assist in his continued care and treatment.

When "Accept button 188 is touched in FIG. 12E, the "Home" screen of FIG. 5 appears on the monitor 26. Because of the nature of the patient's injuries in this example, the "Trauma" button 312 is engaged and the primary "Trauma" screen shown in FIG. 12F appears on the monitor 26. It should be noted that the "Military Mode" designation is not carried forward into the treatment protocol port of the system 10. That "Military mode" designation is relevant the weight detrmination aspect of the present invention, not the treatment portions. On this screen, the emergency personnel have listed for their consideration the primary categories of treatment that might need to be administered to a victim suffering from a traumatic injury, such as the patient here. These include activation buttons associated with each such category and comprise "Airway" 708, "Ventilator" 710, "Fluids" 712, "Blood Products" 714, and "Analgesia" 716. In this example, because the patient is unconscious and, therefore, unable to prevent anything in his mouth and throat from passing into his lungs nor to ventilate appropriately, it is imperative to ensure the continued maintenance of a viable airway. Thus, the "Airway" button 708 is actuated and the "Trauma/Airway" screen shown in FIG. 12G is caused to appear on the monitor 26.

In FIG. 12G, under the heading "Airway" at 708, there are listed the two primary means of dealing with the issue of ensuring that the patient's airway remains clear, i.e., by the use of "Medications" as indicated by button 718 and by surgical means as indicated by the "Surgical Airway" button 720. In addition, a button 724 is provided to permit the emergency medical personnel to immediately return to the trauma main screen of FIG. 12F. This button is provided such that a rapid response may be made in the event of a drastic change in the patient's condition requiring the emergency medical personnel to react appropriately through a change in the treatment provided. This screen also includes the weight estimation window 186, the caveat window 196 suggesting that an actual weight be determined as soon as practicable, the "Home" button 422, the "Consultant" button 324 and the "Look Up" button 326. In this example, the decision is made to use medications to commence the airway treatment and button 718 is actuated.

When button 718 is actuated, the "Trauma/Airway Medications" screen of FIG. 12H appears on the monitor 26. At this point, the emergency medical personnel present must decide whether the patient needs to have what is known as "pretreatment." Pretreatment is a step that is utilized whenever there is a danger of a head injury being present and is provided prior to intubation for the patient's neuro-protection. Here, since the soldier was the victim of a blast and because the patient is unconscious, the emergency medical personnel decide that such pretreatment is necessary. Thus, the "Yes" button 726 is actuated rather than a "No" button 728. The screen of FIG. 12H also includes the previously described "Return to Trauma Main Screen" button 724, the weight estimation window 186, the caveat window 196 suggesting that an actual weight be determined as soon as practicable, the "Home" button 422, the "Consultant" button 324, and the "Look Up" button 326. When the "Yes" button 726 is actuated, the second "Trauma/Airway/Medications" screen of FIG. 12I appears.

In FIG. 12I, the emergency medical personnel are provided with two potential medications to use in the pretreatment of the patient, lidocaine and vecuronium, which are presented on buttons 730 and 732, respectively. The screen of FIG. 12I also includes the previously described "Return to Trauma Main Screen" button 724, the weight estimation window 186, the caveat window 196 suggesting that an actual weight be determined as soon as practicable, the "Home" button 422, the "Consultant" button 324, and the "Look Up" button 326. When one of the medications is selected by actuating the appropriate button, in this case, that for vecuronium 732, the screen of FIG. 12J appears on the monitor 26.

In FIG. 12J, it can be seen that the system 10 determines that the correct dosage of vecuronium for pretreatment is 0.01 mg/kg of patient weight and that, based upon the patient's calculated weight of 60.3 kg, 0.60 mg of vecuronium should be delivered via IV to the patient on the button 734. The screen also suggests once again that lidocaine be considered as an alternative or adjunct at window 736. The screen of FIG. 12I also includes the previously described "Return to Trauma Main Screen" button 724, the weight estimation window 186, the caveat window 196 suggesting that an actual weight be determined as soon as practicable, the "Home" button 422, the "Consultant" button 324, and the "Look Up" button 326.

Figure 12K:
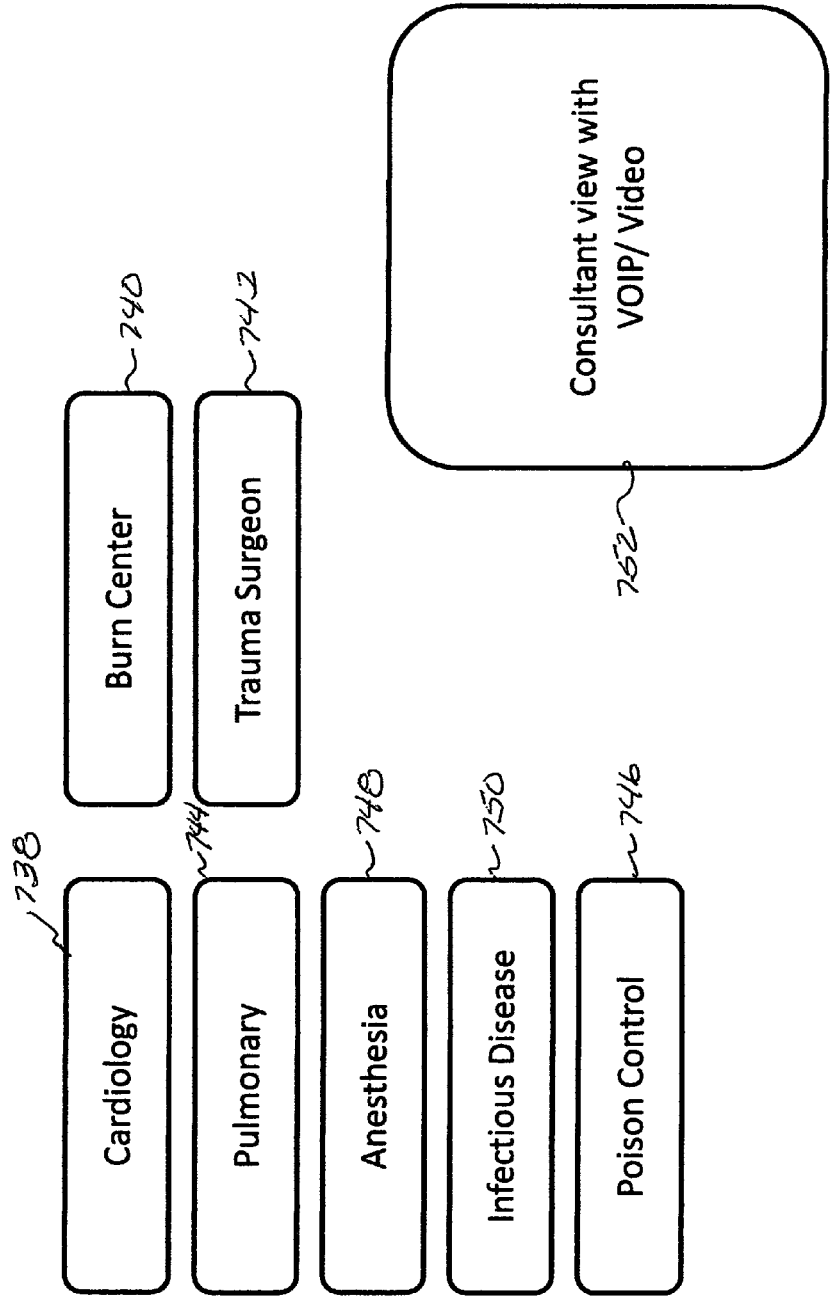

In this example, due to the severity of the patient's injuries, the emergency medical personnel decide that, rather than make any decisions regarding this patient by themselves, a consultant should be brought into the decisional process. Therefore, rather than actuating either the "Vecuronium" or "Lidocaine" buttons, 734 and 736, respectively, the "Consultant" button 324 is utilized. This action results in the screen of FIG. 12K appearing on the monitor 26. FIG. 12K is the "Consultant" screen. On it are a series of buttons that relate to the various fields of medical specialty that might be needed to reenforce the skills of those emergency medical professionals who are presently dealing directly with the patient. These include "Cardiology," button 738, "Burn Center," button 740, "Trauma Center," button 742, Pulmonary," button 744, "Poison Center," button 746, "Anesthesia," button 748, and "Infectious Disease," button 750. This list is, of course, not intended to be limiting, but only exemplary of the specialties that might be so listed. It is also within the scope of the present invention that when a button is actuated for a field of specialization, that a succeeding screen would then break that larger field down into more specific specializations. In the present example, the selection of the "Trauma Center" button 742 connects the field hospital directly to the trauma center where the patient is likely to be transported shortly for continuing care and potentially to the trauma surgeon/specialist at that trauma center who will attend to this patient upon his arrival. Once connected, with the trauma center, the trauma surgeon/specialist is able to access all of the data that has been collected by the team in the field hospital, including all medications delivered to the patient, is able to see the patient and the emergency medical personnel via the video 36, See FIG. 1, and may communicate with that team via the Internet with the trauma surgeon/specialist appearing in the large window 752 in the screen of FIG. 12K. In essence, the trauma surgeon/specialist at the trauma center then prepare to take over as the primary care provider even though he or she may be some distance from the patient at that time. In this way, the emergency medical team at the field hospital unit can work with the trauma surgeon/specialist to provide all necessary care for the patient at the field hospital unit so that the patient is put into the best possible condition for transport to the trauma center. Simultaneously, the trauma surgeon specialist is as prepared as possible to commence treatment once the injured soldier patient reaches the trauma center.

Figure 13:
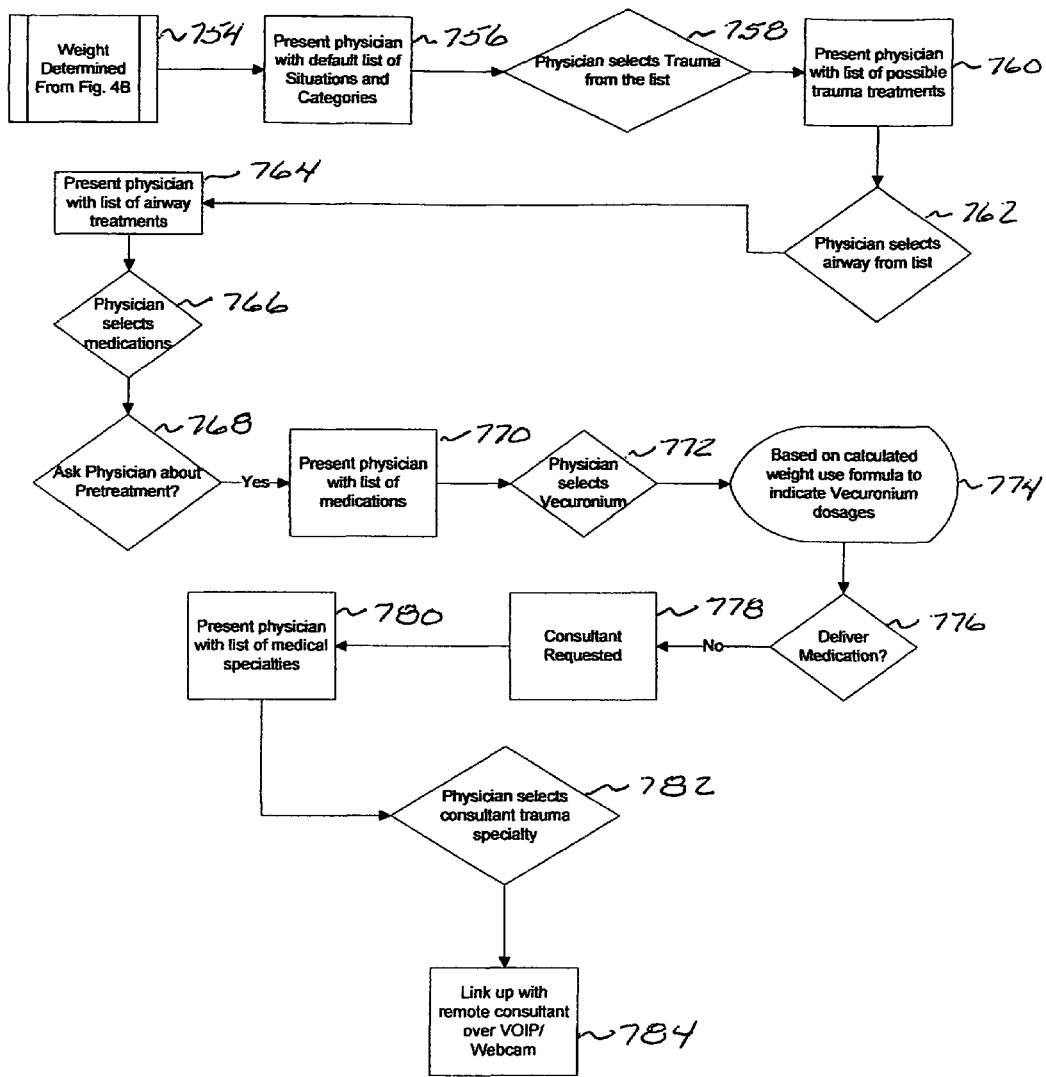
FIG. 13 is a flow charts that corresponds to the series of events that are depicted in the screens shown in FIGS. 12A through 12K.

Finally, the flow chart of FIG. 13 reflects that process through which the system 10 goes during the example at hand. Initially, at step 754, the flow chart begins with the patient's calculated weight as it is determined in the screen of FIG. 12E. The procedure for determining the patient's calculated weight is essentially the same as that shown in the flow chart of FIG. 4 and no purpose is seen in repeating that here. Similarly, at step 756, the emergency medical personnel including an emergency physician, is presented with the list of possible patient conditions as shown in FIG. 5. From this list, the "Trauma" category is selected at step 758. This selection causes the list of possible trauma treatments to be presented to the emergency medical personnel at step 760. From this list, at step 762, the emergency physician selects the "Airway" treatment since it is likely that some impairment of the patient's airway is present due to the explosion that he has encountered and since maintenance of the patient's airway is deemed to be the most critical issue to be addressed with a trauma patient.

Then, at step 764, the list of possible airway treatments found in the screen of FIG. 12G is presented to the emergency medical personnel and the option of using medications is selected at step 766. The emergency physician is then queried at step 768 as whether pretreatment of the patient is needed. When the response to the inquiry is positive, the emergency medical personnel are presented with a list of possible medications for use in that pretreatment at step 770. When vecuronium is selected by the emergency physician at step 772, the system 10 calculates at step 774, using the previously determined weight for the patient, the proper dosage of vecuronium to be administered to the patient.

However, because the emergency medical personnel at the field hospital are incapable of providing all of the necessary care needed by the patient at their treatment facility, rather than administer the vecuronium to the patient, the decision is to request the concurrence of a specialized consultant at step 778. The system 10 then presents the emergency personnel with a list of specialty areas of medicine at step 780. From the list, the emergency physician selects the trauma surgeon/specialist at step 782. Finally, the consultant trauma surgeon/specialist connects, at step 784, with the emergency medical personnel at the field hospital, confers with them as to treatment to be provided there, and prepares to take over the responsibility for the treatment of the patient upon his arrival at the trauma center. At this time, the trauma specialist is able to look at the patient's records and observe the patient through the video equipment at the field hospital.

While there have been shown and described what are considered presently to be the preferred embodiments of the present invention, it will be obvious to those skilled in the art to which this invention pertains that various changes and modifications therein may be made without departing from the spirit and scope of the present invention as defined by the appended claims.

I claim:

1. A system for accurately estimating the weight of a non-responsive, potentially critically ill patient in an emergency care environment comprising:
    a scale capable of measuring a weight of a patient along with any equipment associated with the patient;
    one or more computer processors, at least one of which is located in the emergency care environment, the one or more computer processors being programmed to receive information relevant to the patient's weight from the scale, including but not limited to the overall weight of the patient and all clothing, transport apparatus, and equipment then associated with the patient;
    means for entering into the at least one computer processor in the emergency care environment additional information concerning the nature of the clothing worn by the patient, the identity of the transport apparatus, and each item of equipment then associated with the patient; and
    one or more data bases operatively associated with the one or more computer processors to provide the information necessary for the one or more computer processors to accurately determine or estimate the weights of all of the clothing, transport apparatus, and equipment then associated with the patient, the one or more computer processors being able to subtract from the overall weight of the patient including all clothing, transport apparatus, and equipment then associated with the patient the weight of the clothing, transport apparatus, and equipment then associated with the patient to accurately determine or estimate the weight of the patient without removing clothing from the patient or any items of equipment associated with the patient and placed on the scale with the patient.

2. The system according to claim 1, wherein there is further included a means for generating, at the earliest possible time following determination of the patient's weight, a patient identification label, which label includes means for identifying the patient and for accessing in the one or more computer processors and data bases a complete record of the medication events administered to the patient from the time of entry into the emergency care environment until the time when the information is accessed.

3. The system according to claim 2, wherein the means for generating is a barcode printer.

4. The system according to claim 1, wherein the one or more data bases include data which may be used by the computer processors to accurately estimate the weight of the clothing and any other item being worn by the patient.

5. The system according to claim 1, wherein the one or more data bases include data which may be used by the computer processors to accurately define the tare weight of the transport apparatus upon which the patient is brought into the emergency care environment.

6. The system according to claim 1, wherein the one or more data bases include data which may be used by the computer processors to accurately define the weight of any item of life support apparatus that may be located on the transport apparatus along with the patient when the patient is brought into the emergency care environment.

7. The system according to claim 1, wherein there is further included a receiving platform to determine the gross weight for the patient, the transport apparatus upon which the patient is brought into the emergency care environment, and all life support apparatus that is located on the transport apparatus along with the patient.

8. A system for accurately estimating the weight of a non-responsive, potentially critically ill patient in an emergency care environment and for monitoring the treatment given to the patient comprising:
    a scale capable of measuring a patient's weight along with any equipment associated with the patient;
    one or more computer processors, at least one of which is located in the emergency care environment, the one or more computer processors being programmed to receive information relevant to the patient's weight from the scale, including but not limited to the overall weight of the patient and all clothing, transport apparatus, and equipment then associated with the patient;
    means for entering into the at least one computer processor in the emergency care environment additional information concerning the nature of the clothing worn by the patient, the identity of the transport apparatus, and each item of equipment then associated with the patient;
    one or more data bases operatively associated with the one or more computer processors to provide the information necessary for the one or more computer processors to accurately determine or estimate the weights of all of the clothing, transport apparatus, and equipment then associated with the patient, the one or more computer processors being able to subtract from the overall weight of the patient and all clothing, transport apparatus, and equipment then associated with the patient the weight of the clothing, transport apparatus, and equipment then associated with the patient to accurately determine or estimate the weight of the patient without having to remove a patients clothing or any equipment associated with the patient placed on a scale with the patient; and
    the one or more computer processors having software resident thereon which addresses at least the more frequently encountered medical conditions in the emergency care environment, the software being capable of tracking a preferred protocol for treating each of the frequently encountered medical conditions including the administration of appropriate dosages of drugs or other medications to the patient based upon the determined weight of the patient.

9. The system according to claim 8, wherein the one or more data bases include data which may be used by the computer processors to determine whether there is a likelihood of a dangerous interaction existing between drugs or other medications selected for administration to the patient.

10. The system according to claim 8, wherein the one or more data bases include data which may be used by the computer processors to suggest to emergency medical personnel drugs, medications and procedures that may be appropriate for treating a specific medical condition exhibited by the patient.

11. The system according to claim 8, wherein the one or more computer processors apply a time stamp to every event that is recorded during the treatment of the patient in the emergency care environment.

12. The system according to claim 11, wherein there is further included a means for generating, at the earliest possible time following determination of the patient's weight, a patient identification label, which label includes means for identifying the patient and for accessing in the one or more computer processors and data bases a complete record of the medication events administered to the patient from the time of entry into the emergency care environment until the time when the information is accessed.

13. The system according to claim 8, wherein there is further included a means for permitting emergency medical personnel to switch from a protocol for treating a first medical condition to a second protocol for treating a second medical condition should the condition of the patient change.

14. The system according to claim 8, wherein there is further included a means for contacting an appropriate consultant in a medical specialty and for permitting the consultant to have real time access to a summary of all events that have occurred with respect to a patient while in the emergency care environment.

15. The system according to claim 8, wherein there is further included a means for permitting emergency medical personnel to research topics of interest to the care and treatment of the patient while in the emergency care environment.

16. A system for utilizing the weight of a patient who enters a hospital through the hospital's emergency care environment to define proper dosages of medications and to monitor treatment given to the patient while in the hospital, the system comprising:
a scale capable of measuring a weight of a patient including all clothing worn by the patient and any equipment associated with the patient;
one or more computer processors being programmed to receive information relevant to the patient's weight from the scale, and a selected weight data source;
a first weight data source including means for entering into the one or more computer processors additional information concerning a nature of clothing worn by the patient, the identity of a transport apparatus, and each item of equipment then associated with the patient;
one or more data bases operatively associated with the one or more computer processors to provide the information necessary for the one or more computer processors to accurately determine or estimate the weights of all of the clothing, transport apparatus, and equipment then associated with the patient, the one or more computer processors being able to subtract from the overall weight of the patient and all clothing, transport apparatus, and equipment then associated with the patient the weight of the clothing, transport apparatus, and equipment then associated with the patient to accurately determine or estimate the weight of the patient without having to place the patient on a scale;
a second weight data source comprising means for determining and entering into the one or more computer processors the patient's exact weight;
means for entering into the one or more computer processors information relating to all treatment provided to the patient; and
the one or more computer processors having software resident thereon which addresses at least the more frequently encountered medical conditions in the emergency care environment, the software being capable of tracking a preferred protocol for treating each of the frequently encountered medical conditions including the administration of appropriate dosages of drugs or other medication to the patient based upon the determined weight of the patient.

17. The system according to claim 16, wherein the one or more data bases include data which may be used by the computer processors to determine whether there is a likelihood of a dangerous interaction existing between drugs or other medications selected for administration to the patient.

18. The system according to claim 16, wherein the one or more data bases include data which may be used by the computer processors to suggest to emergency medical personnel drugs, medications and procedures that may be appropriate for treating a specific medical condition exhibited by the patient.

19. The system according to claim 16, wherein the one or more computer processors apply a time stamp to every event that is recorded during the treatment of the patient in the emergency care environment.

20. The system according to claim 16, wherein there is further included a means for generating, at the earliest possible time following determination of the patient's weight, a patient identification label, which label includes means for identifying the patient and for accessing in the one or more computer processors and data bases a complete record of the medication events administered to the patient from the time of entry into the emergency care environment until the time when the information is accessed.

21. The system according to claim 16, wherein there is further included a means for permitting emergency medical personnel to switch from a protocol for treating a first medical condition to a second protocol for treating a second medical condition should the condition of the patient change.

22. The system according to claim 16, wherein there is further included a means for contacting an appropriate consultant in a medical specialty and for permitting the consultant to have real time access to a summary of all events that have occurred with respect to a patient while in the emergency care environment.

23. The system according to claim 16, wherein there is further included a means for permitting emergency medical personnel to research topics of interest to the care and treatment of the patient while in the emergency care environment.

24. A system for accurately estimating an initial weight of a non-responsive, potentially critically ill patient in an emergency care environment comprising:
a receiving platform to determine an initial gross weight for a patient, a transport apparatus upon which the patient is brought into the emergency care environment, and all life support apparatus located on the transport apparatus along with the patient;
an input device located proximate the receiving platform programmed to receive information identifying the transport apparatus, and the life support apparatus located on the transport apparatus along with the patient, the input device further programmed to receive information identifying each article of clothing worn by the patient along with a condition of each article of the clothing worn by the patient;

one or more databases operatively associated with the input device including information indicative of a weight of each identified life support apparatus, the transport apparatus, and an estimate of weight for each identified article of clothing worn by the patient and information for modification to the estimated weight of each identified articles of clothing worn by the patient based on the identified condition of the clothing; and one or more computer processors programmed to determine from the gross weight of the patient, the transport apparatus, and all life support apparatus located on the transport apparatus an estimated weight of the patient without removing the patient from the transport apparatus based on the identified transport apparatus, life support apparatus, articles of clothing and condition of the articles of clothing worn by the patient.

25. The system as recited in claim 24, wherein the one or more computer processors includes software resident thereon including information pertaining to frequently encountered medical conditions in the emergency care environment and communicating a preferred protocol for treating each of the frequently encountered medical conditions including the administration of appropriate dosages of drugs or other medications to the patient based upon the determined weight of the patient.

26. The system as recited in claim 25, wherein the one or more data bases include data which may be used by the computer processors to determine whether there is a likelihood of a dangerous interaction existing between drugs or other medications selected for administration to the patient.

* * * * *

UNITED STATES PATENT AND TRADEMARK OFFICE
CERTIFICATE OF CORRECTION

| | | |
|---|---|---|
| PATENT NO. | : 8,504,323 B2 | Page 1 of 1 |
| APPLICATION NO. | : 12/804149 | |
| DATED | : August 6, 2013 | |
| INVENTOR(S) | : Scott Anthony Coradi | |

It is certified that error appears in the above-identified patent and that said Letters Patent is hereby corrected as shown below:

IN THE CLAIMS:

Claim 1, column 35, line 55: insert --,-- after "patient"

Claim 8, column 36, line 53: insert --,-- after "patient"

Claim 8, column 36, line 57: "a patients" should read as --the patient's--

Claim 16, column 37, line 65: insert --,-- after "patient"

Claim 16, column 38, line 2: delete "place the patient on a scale" and replace with --remove the patient's clothing or any equipment associated with the patient placed on the scale with the patient--

Signed and Sealed this
Fifth Day of August, 2014

Michelle K. Lee
*Deputy Director of the United States Patent and Trademark Office*